(12) United States Patent
Scanlon et al.

(10) Patent No.: US 11,132,565 B2
(45) Date of Patent: Sep. 28, 2021

(54) SYSTEMS AND METHODS FOR ARTIFICIAL INTELLIGENCE (AI) DRIVING ANALYSIS AND INCENTIVES

(71) Applicant: The Travelers Indemnity Company, Hartford, CT (US)

(72) Inventors: Ryan M. Scanlon, East Hampton, CT (US); Alex A. Shyshkov, Roxbury, CT (US); Anna Kulak, Bethany, CT (US); Michael J. Paulukonis, Framingham, MA (US); Oluwatosin K. Edwards, Windsor, CT (US); Anastasia Shekhter, South Windsor, CT (US)

(73) Assignee: The Travelers Indemnity Company, Hartford, CT (US)

( * ) Notice: Subject to any disclaimer, the term of this patent is extended or adjusted under 35 U.S.C. 154(b) by 188 days.

(21) Appl. No.: 16/585,252

(22) Filed: Sep. 27, 2019

(65) Prior Publication Data

US 2021/0097314 A1 Apr. 1, 2021

(51) Int. Cl.
| | | |
|---|---|---|
| *G06K 9/00* | (2006.01) | |
| *G06N 5/04* | (2006.01) | |
| *G07C 5/08* | (2006.01) | |
| *G06T 1/20* | (2006.01) | |
| *G06T 7/00* | (2017.01) | |
| *G06K 9/46* | (2006.01) | |
| *G06T 7/70* | (2017.01) | |

(52) U.S. Cl.
CPC ..... *G06K 9/00825* (2013.01); *G06K 9/00818* (2013.01); *G06K 9/46* (2013.01); *G06N 5/04* (2013.01); *G06T 1/20* (2013.01); *G06T 7/70* (2017.01); *G06T 7/97* (2017.01); *G07C 5/085* (2013.01); *G06K 2209/01* (2013.01); *G06T 2200/24* (2013.01); *G06T 2207/10016* (2013.01); *G06T 2207/30252* (2013.01)

(58) Field of Classification Search
CPC .. G06K 9/00825; G06K 9/46; G06K 9/00818; G06K 2209/01; G06N 5/04; G07C 5/085; G06T 1/20; G06T 7/97; G06T 7/70; G06T 2207/10016; G06T 2200/24; G06T 2207/30252
USPC .......................................................... 382/103
See application file for complete search history.

(56) References Cited

U.S. PATENT DOCUMENTS

2019/0259284 A1* 8/2019 Khadloya ................ G06T 7/97
2019/0347806 A1* 11/2019 Vajapey ................ G06T 7/246

OTHER PUBLICATIONS

Website: "https://gotruemotion.com/safe-driving-apps/" download date Dec. 5, 2019; 3 pps.
Website: "https://www.everquote.com/everdrive/" download date Dec. 5, 2019; 1 pps.

* cited by examiner

*Primary Examiner* — Stephen P Coleman
(74) *Attorney, Agent, or Firm* — RowanTree Law Group, PLLC; Carson C. K. Fincham

(57) ABSTRACT

Systems, apparatus, methods, and articles of manufacture for Artificial Intelligence (AI) driving analysis and incentives, by utilizing on-board image object analysis to classify driving events and provide driving-based awards.

15 Claims, 13 Drawing Sheets

SYSTEMS AND METHODS FOR ARTIFICIAL INTELLIGENCE (AI) DRIVING ANALYSIS AND INCENTIVES

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND

Driver safety, particularly among new or teen drivers, continues to be a problem. As reported by the U.S. Department of Transportation National Highway Traffic Safety Administration (NHTSA)[1], See, https://www.nhtsa.gov/road-safety/teen-driving#topic-prental-influence motor vehicle accidents remain the leading cause of death for teens, and likely due to increased opportunities for distracted driving (on-board or hand-held navigation systems, hand-held phone dialing or texting, etc.), overall roadway fatalities are currently increasing.

Currently, three (3) overall types of solutions may be utilized in an attempt to alleviate teen driving issues. First, passive safe driving programs and websites allow teens to learn about safe driving and safe driving habits. Second, various "black box", telematic device, and mobile device applications utilize Global Positioning System (GPS) data and/or accelerometers to measure driving parameters, such as hard braking, speeding, and the like. And third, on-board cameras (either built-in or removable dash-cams) allow recording of video footage (e.g., for after-event review) or allow for certain real-time alerts, such as drifting from a lane or approaching another vehicle too quickly. Many modern vehicles now also include proactive safety features, such as lane-keeping assistive steering and automatic braking to help avoid collisions.

Each of these solutions, however, suffer from deficiencies. Passive driver safety programs are important to help young drivers understand what they should be doing behind the wheel, for example, but are not tied to actual driving performance and accordingly cannot provide guidance or corrections for specific actions a driver has taken in the real world. GPS and accelerometer devices provide good insight into driving behaviors, such as speeding and hard braking, but do so in a vacuum. GPS and accelerometer readings are disembodied from the outside environment of the vehicle, for example, and therefore cannot distinguish between events that provide similar measurements, but that occur in different driving scenarios. And vehicle or dash-cam devices may be programmed to provide some basic guidance (e.g., lane keeping), but do not capture data descriptive of a driver's overall performance. Both GPS/accelerometer and camera-based systems raise significant privacy concerns as well.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Existing systems for driving analysis either rely on raw data disconnected from the environment of the vehicle or are operable to provide limited real-time alerts for discrete events, but fail to provide overall driving analysis. Real-time alerts may also increase driver distraction, and both types of systems raise privacy concerns by tracking driver locations and actions and distributing the data in the cloud. Camera-based systems do not analyze and track driver behavior and such systems that are incorporated into autonomous vehicles, while they do analyze the environment of the vehicle, inherently do not analyze and track driver behavior, for such vehicles are driverless.

In accordance with embodiments herein, these and other deficiencies of existing systems are remedied by providing systems, apparatus, methods, and articles of manufacture for Artificial Intelligence (AI) driving analysis and incentives that utilize on-board image object analysis to classify driving events and provide driving-based awards. In some embodiments, for example, objects may be detected in the path of the vehicle and analyzed over time to classify and identify a driving behavior (e.g., a good behavior or bad behavior). In some embodiments, driver behaviors may be assigned points, scores, ranks, or otherwise quantified to derive an overall score, rank, point total, etc., for a particular driver. According to some embodiments, all such analysis and scoring may be accomplished on-board, so that no detailed data (e.g., descriptive of any particular event, such as location) regarding the driver is transmitted external to the vehicle, thereby maintaining driver privacy. In some embodiments, aggregate driving behavior data (e.g., one or more scores, point totals, rankings, etc.) may be utilized to provide awards or incentives to a driver and/or may be utilized to compare, rank, or provide a competition between two or more drivers.

II. AI Driving Analysis and Incentive Systems

Figure 1:
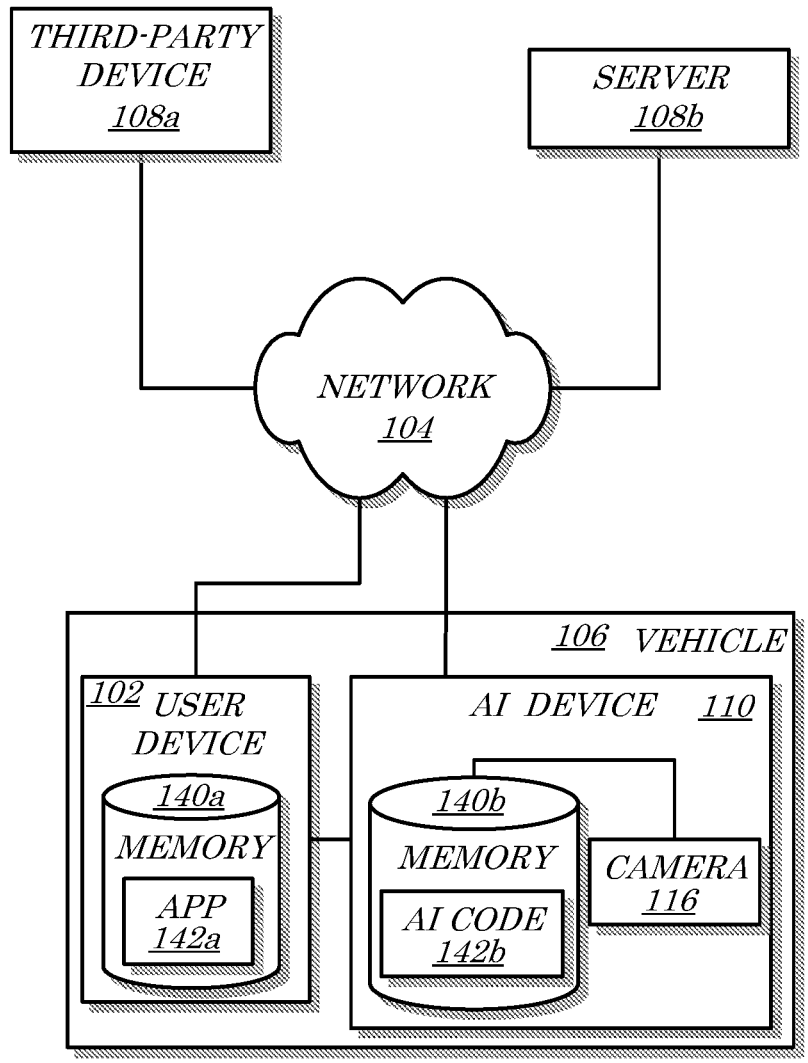
FIG. 1 is a block diagram of a system according to some embodiments.

Referring first to FIG. 1, a block diagram of a system 100 according to some embodiments is shown. In some embodiments, the system 100 may comprise a user device 102 in communication via or with a network 104. According to some embodiments, the user device 102 may be disposed in, in communication with, and/or otherwise associated with a vehicle 106. In some embodiments, the system 100 may comprise and/or the user device 102 may be in communication with a third-party device 108a, a server 108b, and/or an AI device 110. In some embodiments, the AI device 110 (and/or the vehicle 106) may comprise a camera 116 (e.g., oriented and/or disposed to capture images, video, and/or audio descriptive of an environment in which the vehicle 106 is disposed). According to some embodiments, any or all of the devices 102, 106, 108a-b, 110 may comprise and/or be in communication with a data storage and/or memory device 140a-b. The user device 102 may comprise a mobile device housing a local or first memory device 140a, for example, and/or the AI device 110 may comprise a second memory device 140b. As depicted in FIG. 1, any or all of the devices 102, 106, 108a-b, 110, 116, 140a-b (or any combinations thereof) may be in communication via the network 104. In some embodiments, communications between and/or within the devices 102, 106, 108a-b, 110, 116, 140a-b of the system 100 may be utilized to capture and analyze images to score, rank, and/or reward a driver (not shown) of the vehicle 106. The user device 102 may output an indication of a driving score, point total, rank, etc., for example, by execution of an application (or "app") 142a stored in the first memory device 140a. According to some embodiments, such score, point total, rank, etc., may be calculated, looked up, derived, defined, computed, and/or otherwise determined by analysis of imagery captured by the camera 116 pursuant to an execution of AI code 142b stored in the second memory device 140b of the AI device 110.

Fewer or more components 102, 104, 106, 108a-b, 110, 116, 140a-b, 142a-b and/or various configurations of the depicted components 102, 104, 106, 108a-b, 110, 116, 140a-b, 142a-b may be included in the system 100 without deviating from the scope of embodiments described herein. In some embodiments, the components 102, 104, 106, 108a-b, 110, 116, 140a-b, 142a-b may be similar in configuration and/or functionality to similarly named and/or numbered components as described herein. In some embodiments, the system 100 (and/or portion thereof) may comprise an AI-based driving analysis and/or incentive system, and/or platform programmed and/or otherwise configured to execute, conduct, and/or facilitate the method 400 of FIG. 4 herein, and/or portions thereof.

The user device 102, in some embodiments, may comprise any type or configuration of computing, mobile electronic, network, user, and/or communication device that is or becomes known or practicable. The user device 102 may, for example, comprise one or more Personal Computer (PC) devices, computer workstations, tablet computers, such as an iPad® manufactured by Apple®, Inc. of Cupertino, Calif., and/or cellular and/or wireless telephones, such as an iPhone® (also manufactured by Apple®, Inc.) or an LG V50 THINQ™ 5G smart phone manufactured by LG® Electronics, Inc. of San Diego, Calif., and running the Android® operating system from Google®, Inc. of Mountain View, Calif. In some embodiments, the user device 102 may comprise one or more devices owned and/or operated by one or more users (not shown), such as a driver of the vehicle 106 and/or an electronic product (e.g., underwriting product) customer (or potential customer). According to some embodiments, the user device 102 may communicate with the AI device 110 either directly or via the network 104 to view, retrieve, and/or redeem AI driving analysis scores, points, ranks, standings, awards, and/or incentives, in accordance with AI driving analysis and/or incentive processes as described herein.

The network 104 may, according to some embodiments, comprise a Local Area Network (LAN; wireless and/or wired), cellular telephone, Bluetooth®, Near Field Communication (NFC), and/or Radio Frequency (RF) network with communication links between the AI device 110, the server 108b, the user device 102, the third-party device 108a, and/or the memory devices 140a-b. In some embodiments, the network 104 may comprise direct communication links between any or all of the components 102, 104, 106, 108a-b, 110, 116, 140a-b, 142a-b of the system 100. The user device 102 may, for example, be directly interfaced or connected to one or more of the AI device 110 and/or the third-party device 108a via one or more wires, cables, wireless links, and/or other network components, such network components (e.g., communication links) comprising portions of the network 104. In some embodiments, the network 104 may comprise one or many other links or network components other than those depicted in FIG. 1. The AI device 110 may, for example, be connected to the server 108b and/or the third-party device 108a via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102, 104, 106, 108a-b, 110, 116, 140a-b, 142a-b of the system 100. The network 104 may comprise one or more cellular telephone networks with communication links between the user device 102 and the server 108b, for example, and/or may comprise an NFC or other short-range wireless communication path, with communication links between the AI device 110, the camera 116, the user device 102, and/or one or more of the memory devices 140a-b, for example.

According to some embodiments, the vehicle 106 may comprise any type, quantity, and/or configuration of transportation object that is or becomes known or practicable. The vehicle 106 may comprise a passenger vehicle or fleet vehicle, for example, that is utilized by a young or new driver and includes the AI device 110 to analyze and incentivize safe driving habits. In some embodiments, a plurality of vehicles 106 may be in proximity to each other and/or in communication with each other to facilitate AI driving analysis and/or incentives as described herein. A network or group of vehicles (not explicitly depicted in FIG. 1) may, for example, include AI devices 110 that analyze respective driving patterns, incidents, and/or behavior for each vehicle 106, and each driver and/or vehicle 106 (or associated account, avatar, handle, screen-name, etc.) may be ranked, sorted, and/or rewarded either cooperatively or adversarially, as part of a group incentive or award game or competition.

The third-party device 108a, in some embodiments, may comprise any type or configuration of a computerized processing device, such as a PC, laptop computer, computer server, database system, and/or other electronic device, devices, or any combination thereof. In some embodiments, the third-party device 108 may be owned and/or operated by a third-party (i.e., an entity different than any entity owning and/or operating either the user device 102 or the AI device 110; such as a certificate, authentication, a cryptographic service provider, a game server or provider, and/or a reward redemption server or machine). The third-party device 108a may, for example, execute one or more web services that provide for centralized firmware and/or logic updating functionality, online game hosting, and/or prize distribution functionality. In some embodiments, the third-party device 108a may provide and/or transmit rewards (e.g., various products and/or services) to the user device 102 and/or the server 108*b*. According to some embodiments, the third-party device 108*a* may comprise a plurality of devices and/or may be associated with a plurality of third-party entities.

In some embodiments, the server 108*b* may comprise an electronic and/or computerized controller device, such as a computer server communicatively coupled to interface with the user device 102, the AI device 110, and/or the third-party device 108*a* (directly and/or indirectly). The server 108*b* may, for example, comprise one or more PowerEdge™ R830 rack servers manufactured by Dell®, Inc. of Round Rock, Tex. which may include one or more Twelve-Core Intel® Xeon® E5-4640 v4 electronic processing devices. In some embodiments, the server 108*b* may comprise a plurality of processing devices specially programmed to execute and/or conduct processes that are not practicable without the aid of the server 108*b*. The server 108*b* may, for example, execute one or more coded rules to manage wireless communications of the user device 102 (e.g., a cellphone service provider) and/or the AI device 110, which would not be capable of being conducted without the benefit of the specially-programmed server 108*b*. According to some embodiments, the server 108*b* may be located remotely from the user device 102 and/or the AI device 110 (e.g., remote from the vehicle 106). The server 108*b* may also or alternatively comprise a plurality of electronic processing devices located at one or more various sites and/or locations.

According to some embodiments, the AI device 110 may comprise a stand-alone device that is mounted in and/or otherwise housed within or on the vehicle 106. The AI device 110 may, for example, comprise the camera 116 and may be oriented or disposed to capture imagery, video, and/or audio descriptive of an environment around or in a specific direction with respect to (e.g., in front of) the vehicle 106. The AI device 110 may comprise various processing elements, components, and/or circuits (not shown) that permit or enable the AI code 142*b* to be executed to classify and analyze data received from the camera 116. In such a manner, for example, the AI device 110 may be operable to derive one or more scores, point totals, and/or other quantitative metrics descriptive of how the driver performs while driving (or piloting or otherwise utilizing) the vehicle 106.

According to some embodiments, the AI device 110 may store and/or execute specially programmed instructions (not separately shown in FIG. 1) to operate in accordance with embodiments described herein. The AI device 110 may, for example, execute one or more programs, modules, and/or routines (e.g., the AI code 142*b*) that facilitate the analysis and/or incentivizing of driving behaviors of a driver of the vehicle 106, as described herein. According to some embodiments, the AI device 110 may comprise a computerized processing device, such as a mobile or hand-held computer device and/or other specialized electronic device to identify and manage the distribution or awarding of incentives to a driver. A driver, fleet owner, rental car company, parent, and/or other user may, for example, utilize the AI device 110 to (i) identify an object (not shown) in view of the vehicle 106, (ii) identify a movement of the vehicle 106 with respect to the object, (iii) classify a driving behavior or action based on the relationship between the vehicle 106 and the object, (iv) identify an award or other incentive earned by the driver based on the driving behavior, and/or (v) provide an interface via which the driver/user may view scores, points, statistical metrics, and/or awards, and/or may redeem or collect awards or incentives, as described herein.

In some embodiments, the user device 102, the third-party device 108*a*, the server 108*b*, and/or the AI device 110 may be in communication with and/or comprise the memory devices 140*a-b*. The memory devices 140*a-b* may comprise, for example, various databases and/or data storage mediums that may store, for example, image data, object identification rules, object data, driving rule and/or scenario data, driving behavior data, location data, incentive and/or award data, game or competition data, cryptographic keys and/or data, login and/or identity credentials, and/or instructions (e.g., AI-base driving analysis and incentive instructions) that cause various devices (e.g., the AI device 110, the third-party device 108*a*, the server 108*b*, and/or the user device 102) to operate in accordance with embodiments described herein.

The memory devices 140*a-b* may store, for example, the AI code 142*b* and/or the app 142*a*, each of which may, when executed, participate in and/or cause AI-based driving analysis and/or incentivizations, as described herein). In some embodiments, the memory devices 140*a-b* may comprise any type, configuration, and/or quantity of data storage devices that are or become known or practicable. The memory devices 140*a-b* may, for example, comprise an array of optical and/or solid-state hard drives configured to store digital image and/or video data, image and/or object analysis data and/or driving incentive and/or gaming data (e.g., analysis formulas and/or mathematical models), credentialing instructions and/or keys, and/or various operating instructions, drivers, etc. While the memory devices 140*a-b* are depicted as stand-alone components of the user device 102 and the AI device 110, the memory devices 140*a-b* may comprise multiple components. In some embodiments, a multi-component memory device 140*a-b* may be distributed across various devices and/or may comprise remotely dispersed components. Any or all of the user device 102, the vehicle 106, the third-party device 108*a*, the server 108*b*, and/or the AI device 110 may comprise the memory devices 140*a-b* or a portion thereof, for example.

Figure 2:
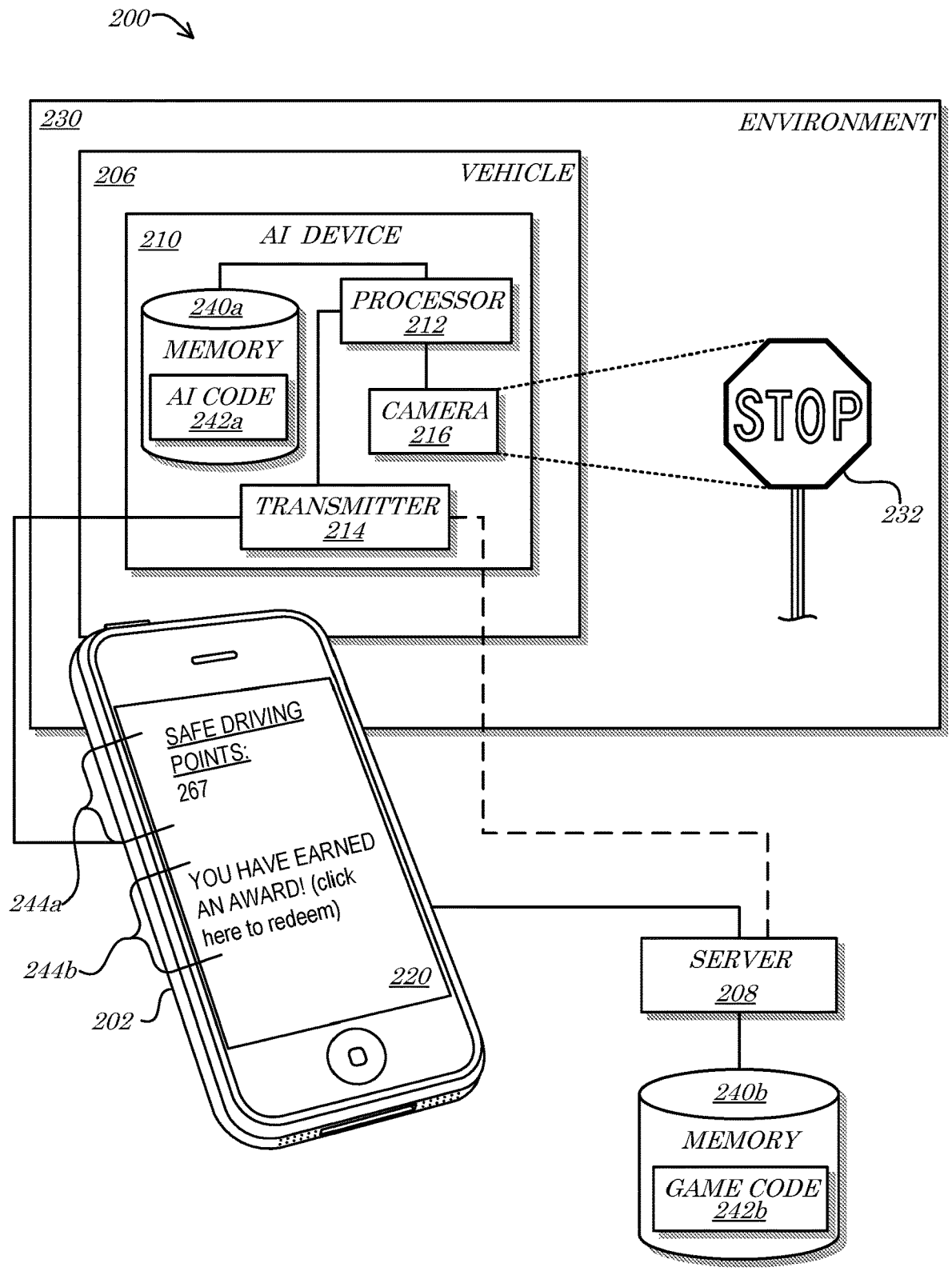
FIG. 2 is a block diagram of a system according to some embodiments.

Turning now to FIG. 2, a block diagram of a system 200 according to some embodiments is shown. In some embodiments, the system 200 may comprise a user device 202 (e.g., disposed in, near, and/or otherwise associated with a vehicle 206) in communication with one or more of a server 208 and an AI device 210. In some embodiments, the AI device 210 may be mounted in or coupled to the vehicle 206. The AI device 210 may comprise, for example, a processor 212 in communication with each of a transmitter 214 and a camera 216. According to some embodiments, the AI device 210 may utilize the processor 212 to process data received by the camera 216 and may transmit data (e.g., safe driving scores or points) to the user device 202 via the transmitter 214. In some embodiments, the user device 202 may generate and/or output an interface 220, e.g., in response the transmitting by the AI device 210.

According to some embodiments, the AI device 210 may utilize the camera 216 to capture data (e.g., images, video, and/or audio) descriptive of an environment 230 in which the vehicle 206 is disposed. The camera 216 may be oriented, for example, to capture data descriptive of an object 232, such as the stop sign depicted in FIG. 2 as a non-limiting example (e.g., in the case the vehicle 206 comprises an on-road vehicle, such as a car or truck). In some embodiments, the data from the camera 216 may be provided to and/or processed by the processor 212. According to some embodiments, the AI device 210 and/or the server 208 may comprise and/or be in communication with one or more databases or memory devices 240*a-b*. A first memory device 240*a* of the AI device 210 may, for example, store AI code 242*a* that is operable to be executed by the processor 212 to process the data from the camera 216. In some embodiments, the processed data may be provided (e.g., via the transmitter 214) to the user device 202 and/or the server 208. The server 208 may, for example, access a second memory 240*b* storing game code 242*b* that is operable to be executed by the server 208 (and/or the user device 202) to input the processed data from the AI device 210 and resolve an outcome of a game in response thereto. According to some embodiments, the processed data from the AI device 210 and/or data descriptive of the game (and/or awards or other incentives) from the server 208 may be provided to the user device 202 and/or output via the interface 220 (e.g., to a user (not shown) of the user device 202, such as a driver of the vehicle 206). As depicted in FIG. 2, for example, the interface 220 may output indications of driving analysis data 244*a* (e.g., a score or point total) and/or incentive/award or game data 244*b* (e.g., an indication of an award).

In some embodiments, such as in the case that the vehicle 206 is being operated by the driver/user, the AI device 210 may activate the camera 216 to capture images of the environment 230. According to some embodiments, the images may be processed by the processor 212 by an execution of the AI code 242*a* stored in the first memory device 240*a*. The AI code 242*a* may, for example, comprise various specially programmed rules and logic, such as an object detection algorithm that is utilized to identify the object 232 in the environment 230. According to some embodiments, the processor 212 executing the AI code 242*a* may identify, based on a comparison of the detected object 232 in various images (e.g., at two or more moments in time), a first instance of a particular type of driving event. The AI device 210 may determine, for example, that the driver (and accordingly the vehicle 206) has failed to stop at the stop sign object 232 and may categorize the event as a "failure to stop" event or a poor driving behavior or event.

According to some embodiments, data descriptive of one or more categorized and/or identified driving events or actions may be utilized to assign a quantitative metric value to the driver. A single failure to stop event may equate to a deduction of one hundred (100) points, for example, and/or multiple such occurrences in a predetermined time period (e.g., a single trip, a single day, a week, etc.) may equate to a score of zero (0). In some embodiments, the AI code 242*a* may define rules and/or logic that defines or correlates the identified and categorized events to quantitative metric values. According to some embodiments, the AI device 210 may identify and tabulate the driving events and may transmit the tabulated data (e.g., via the transmitter 214) to the user device 202 and/or the server 208. The user device 202 may execute an application (not separately depicted) and/or the server may execute the game code 242*b*, for example, and either (or both) may utilize tabulated driving event data from the AI device 210 to derive, calculate, lookup, and/or or otherwise resolve one or more game outcomes and/or incentive awards. The game code 242*b* may store, for example, predefined point/score thresholds that correspond to different awards or possibilities of achieving awards (i.e., a chance in a random drawing). According to some embodiments, the user device 202 and/or the server 208 may resolve and/or otherwise determine game results and/or awards based on a comparison (e.g., a ranking) of driving data received from the AI device 210 with respect to the driver of the vehicle 206 with driving data received from other devices (not shown) and/or with respect to other drivers and/or vehicles (also not shown).

In some embodiments, the driving data from the AI device 210 (e.g., the driving analysis data 244*a*) may be received by the user device 202 from the transmitter 214 and/or may be reviewed by the user/driver (e.g., the user/driver may view the output driving analysis data 244*a* via the interface 220). According to some embodiments, the user/driver may decide or choose which data from the AI device 210 is permitted to be uploaded to the server 208. In such a manner, for example, while the tabulated and/or summary nature of data from the AI device 210 (e.g., total number of good/bad stops) is already inherently cleansed of detail to preserve privacy (e.g., no locations, times, etc., are provided), the user/driver may be permitted even greater control over privacy by allowing the user/driver to decide (e.g., via selections made through the interface 220) which tabulated/aggregated/summarized data may be utilized to qualify and/or compete for various awards or other incentives. In some embodiments, for example, the user/driver may view the driving analysis data 244*a* comprising the example two hundred and sixty seven (267) safe driving points as received from the AI device 210 based on the user/driver's driving activity and may selectively transmit or provide the driving analysis data 244*a* to the server 208. The server 208 may receive the driving analysis data 244*a* point total, compare the total to one or more stored thresholds (such as a minimum threshold of two hundred and fifty (250) points to earn an award) and/or to point totals from other drivers, and/or may compute (e.g., calculate and/or lookup; e.g., utilizing the game code 242*b*) an award or win condition for the user/driver. According to some embodiments, the server 208 may transmit an indication of the award/win to the user device 202 (e.g., in response to the receiving of the driving analysis data 244*a* point total) and the user device 202 may output the game data 244*b*, which indicates the award/incentive. In such a manner, for example, the AI device 210 may be utilized to allow the user/driver to earn awards and/or otherwise be incentivized to accomplish safe driving actions, without sacrificing privacy of the user/driver and without disrupting the driver (e.g., with real-time driving activity alerts or corrections) during operation of the vehicle 206.

Fewer or more components 202, 206, 208, 210, 212, 214, 216, 220, 230, 232, 240*a-b*, 242*a-b*, 244*a-b* and/or various configurations of the depicted components 202, 206, 208, 210, 212, 214, 216, 220, 230, 232, 240*a-b*, 242*a-b*, 244*a-b* may be included in the system 200 without deviating from the scope of embodiments described herein. In some embodiments, the components 202, 206, 208, 210, 212, 214, 216, 220, 230, 232, 240*a-b*, 242*a-b*, 244*a-b* may be similar in configuration and/or functionality to similarly named and/or numbered components as described herein. In some embodiments, the system 200 (and/or one or more portions thereof) may comprise an AI-based driving analysis and/or incentive system, and/or platform programmed and/or otherwise configured to execute, conduct, and/or facilitate the method 400 of FIG. 4 herein, and/or portions thereof.

Figure 3A:
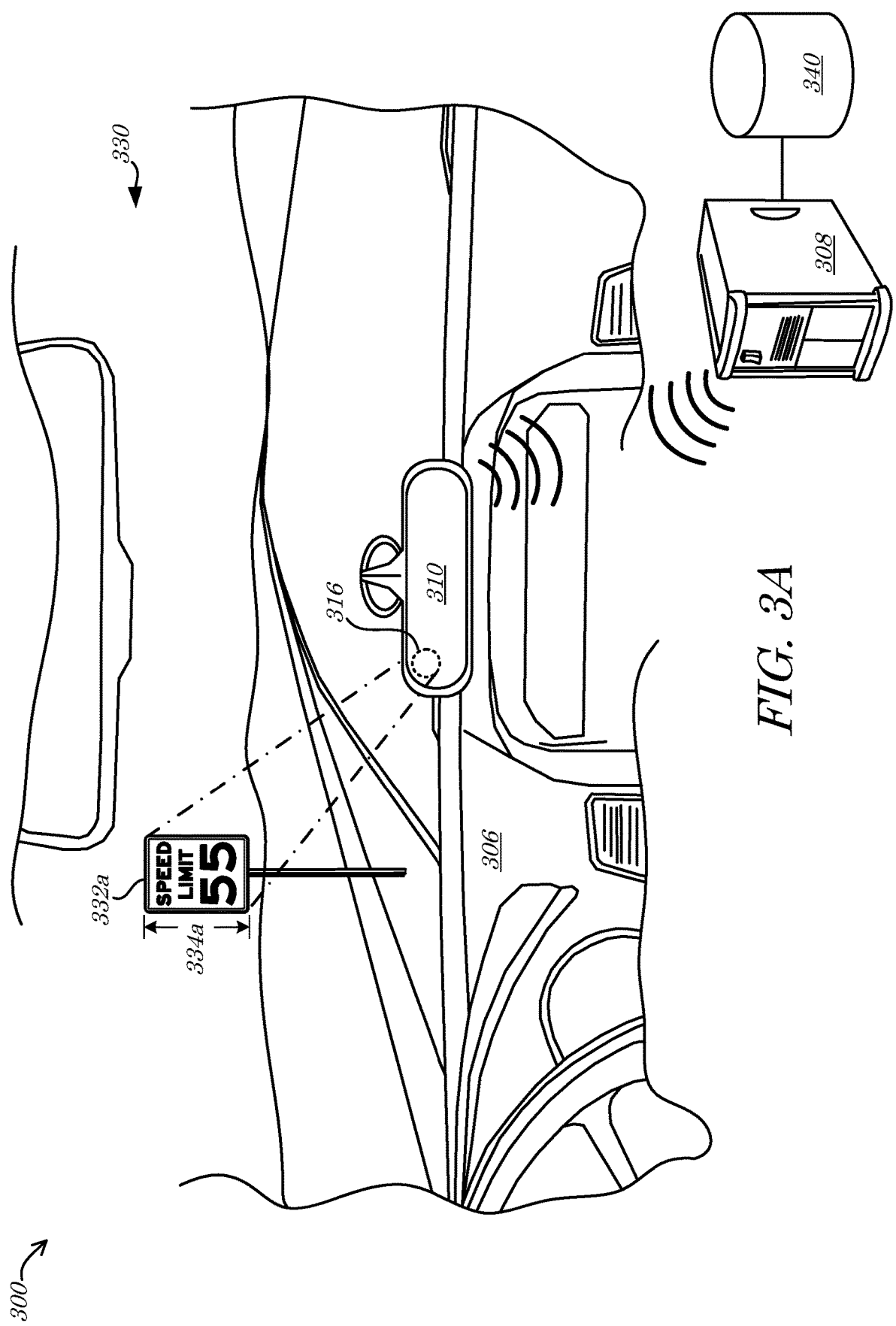
FIG. 3A and FIG. 3B are perspective diagrams of a system at different points in time, according to some embodiments.
Figure 3B:
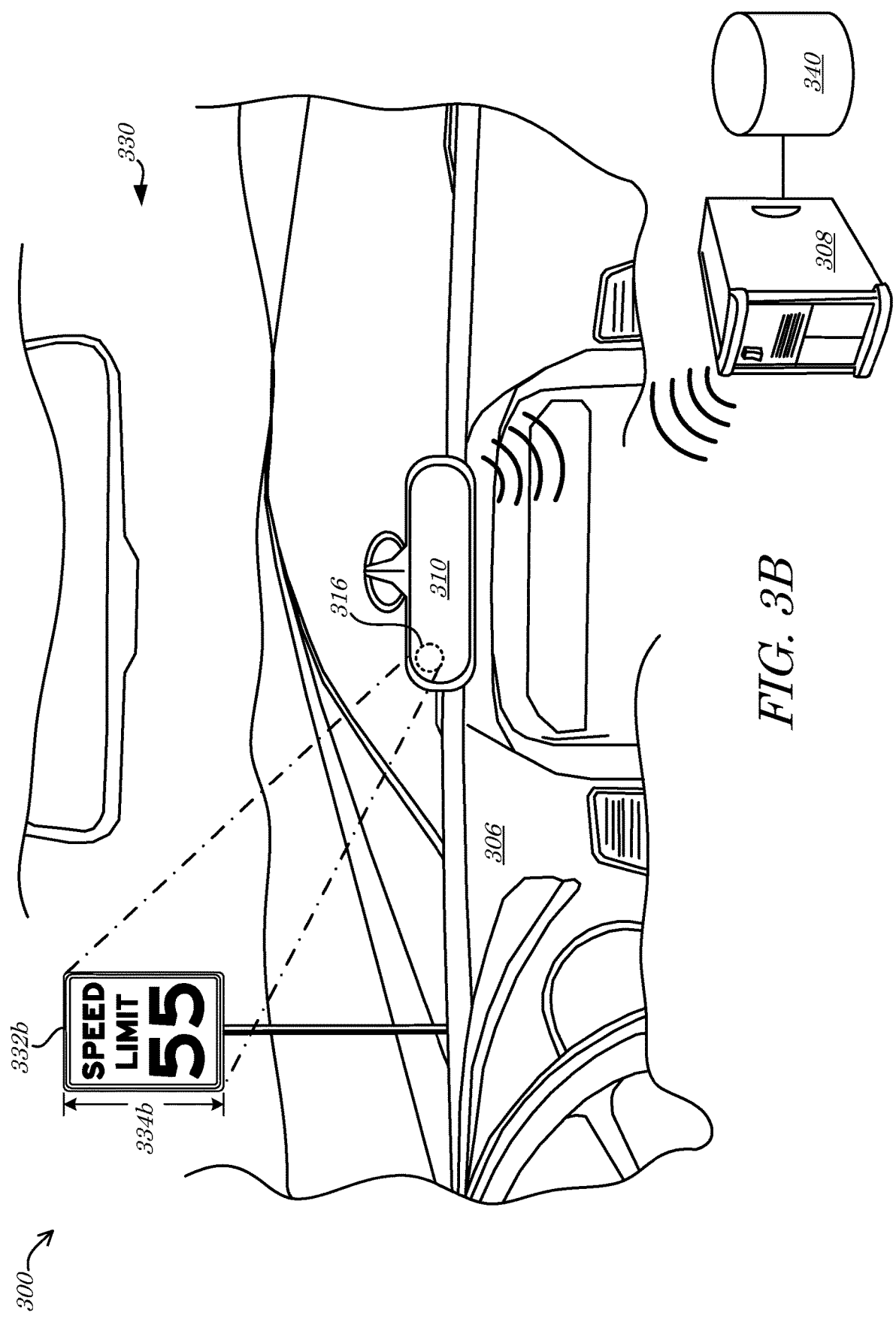

Referring now to FIG. 3A and FIG. 3B, perspective diagrams of a system 300 at different points in time according to some embodiments are shown. The system 300 may comprise, for example, a vehicle 306 and a remotely positioned server 308. According to some embodiments, an AI device 310 disposed in (e.g., coupled to, such as via a windshield suction cup mount as depicted but not separately labeled) the vehicle 306 may comprise a camera 316 (and/or other sensor) oriented to capture data descriptive of an environment 330 outside of the vehicle 306. As depicted for non-limiting purposes of example in FIG. 3A and FIG. 3B, the environment 330 may comprise an area in front of the vehicle 306 (e.g., a view through the windshield (not separately labeled), thereof), such as along a roadway. In some embodiments, the camera 316 may capture or sense data descriptive of the environment 330, such as images and/or video thereof.

According to some embodiments, the AI device 310 may process the data from the camera 316 (and/or other sensor) and execute specially programmed code (software and/or firmware code) to identify an object 332a-b in the environment 330. As depicted for non-limiting purposes of example only, the object 332a-b may comprise a speed limit sign. The AI device 310 may utilize the detection of the object 332a-b in various manners to derive information and/or compute conclusions regarding the operation of the vehicle 306. In some embodiments, for example, the AI device 310 may identify the object 332a-b and execute an Optical Character Recognition (OCR) algorithm to identify alphanumeric data depicted on the object 332a-b. According to some embodiments, the AI device 310 may identify the object 332a-b and execute an object classification algorithm to classify the object 332a-b. In the example case depicted in FIG. 3A and FIG. 3B, the AI device 310 may identify that the object 332a-b is a speed limit sign and that the speed limit proximate to the vehicle 306 is fifty-five miles per hour (55 mph). According to some embodiments, the posted speed limit may be compared to a speed of the vehicle 306 to determine whether the vehicle 306 is speeding or not, and/or by how much the current speed of the vehicle 306 differs from the posted speed limit. While in some embodiments the speed of the vehicle 306 may be obtained directly from the vehicle 306 and/or via an accelerometer or other sensor (not shown) of the AI device 310, in some embodiments the speed of the vehicle 306 (and/or other movement characteristics thereof) may be derived from the information descriptive of the object 332a-b.

In some embodiments, the AI device 310 may execute AI code that analyzes the identified object 332a-b over time to derive data descriptive of movement and/or operation of the vehicle 306 and/or to otherwise identify and/or classify driving events (e.g., that may or may not involve movement of the vehicle 306, such as determining how long the vehicle 306 sits at a green stoplight (not shown)). As depicted in FIG. 3A, for example, the AI device 310 may identify a first instance or view of the object 332a at a first point in time and may identify a first attribute 334a of the first instance of the object 332a, such as a dimension/height, as shown for non-limiting purposes of example. In some embodiments, such as in the case that the object 332a-b is found to be present in multiple images and/or video frames captured by the camera 316, the AI device 310 may identify a second instance or view of the object 332b at a second time, as depicted in FIG. 3B. According to some embodiments, the AI device 310 may compare the first attribute 334a of the first instance of the object 332a to an identified second attribute 334b of the second instance of the object 332b to derive, compute, and/or calculate a characteristic of movement of the vehicle 306 and/or a characteristic or event within the environment 330. In the example depicted in FIG. 3A and FIG. 3B, for example, the AI device 310 may determine that the second attribute 334b comprises a value (e.g., a length) that is larger than a value of the first attribute 334a, and may accordingly infer that the object 332a-b is closer to the vehicle 306 at the second point in time (e.g., the second instance of the object 332b is closer to the vehicle 306 than the first instance of the object 332a).

According to some embodiments, the comparison of the attributes 334a-b may be utilized to lookup, calculate, and/or otherwise compute quantitative metrics regarding the operation of the vehicle 306. Based on the magnitude of the difference between the two points in time and the magnitude of the difference between the values of the attribute 334a-b, for example, the AI device 310 may calculate a speed of the vehicle 306, a direction of travel of the vehicle 306, wind speeds and/or directions in the environment 330, speeds and/or directions of other objects in the environment 330, such as other vehicles (not shown), lane widths, traffic control signal status, etc. In some embodiments, any or all of the data derived from and/or based on the object 332a-b may be utilized to identify and/or classify driving actions or events. The speed of the vehicle 306, as compared to the identified posted speed limit, may be utilized to identify a speeding event (and/or a magnitude, class, or level thereof), for example, and/or derived or estimated distances between the vehicle 306 and other objects (e.g., the object 332a-b) may be utilized to identify a safe following distance event, an unsafe intersection event (e.g., running a red light), an unsafe lane change event, etc. According to some embodiments, the AI device 310 may generate, define, calculate, and/or otherwise compute one or more scores, point totals, rankings, and/or other metrics representing an analysis of the operation of the vehicle 306 over at least the two points in time. The AI device 310 may, for example, determine that the vehicle 306 is currently traveling within a predetermined safety threshold (e.g., five miles per hour (5 mph)) of the posted speed limit (e.g., derived from analysis of the object 332a-b over the two points in time) and may award ten (10) points to the driver and/or may determine that looking backwards in time from the current time over a period of one (1) week, the vehicle 306 has averaged an eighty percent (80%) adherence rate to posted speed limits and that the driver's overall driving safety score is accordingly five hundred (500) points.

In some embodiments, the AI device 310 may transmit an indication of the computed point total, score, ranking, etc. to the server 308. According to some embodiments, the driving analysis score/points may be transmitted along with an identifier of the vehicle 306, the driver, an account, etc. In some embodiments, the transmission may be encrypted, encoded, and/or compressed, e.g., to maintain privacy and/or to reduce bandwidth requirements for the transmission. According to some embodiments, the data transmitted may comprise only an account identifier and a score/point total, such that detailed data regarding the driver (e.g., name, address), vehicle 306 (e.g., identifier, location), and/or event occurrences (e.g., a particular stop sign being run through) is not available outside of the vehicle 306. In such a manner, for example, privacy of the driver may be protected, while also enabling the server 308 to provide incentives to the driver based on driving/operating performance—thereby incentivizing safe driving habits without jeopardizing the driver's privacy.

According to some embodiments, the server 308 may store the incentive data for the driver in a database 340. The server 308 may, for example, store the score/point total for comparison or ranking with other drivers' scores/point totals. In some embodiments, a driver's ranking or standing may define an award or other incentive earned by the driver. Drivers may earn awards based on achievements in reaching point or score thresholds, for example, and/or may earn awards based on their standing in a cooperative or competitive game with other drivers. The top scoring three (3) drivers in a particular geographic area and/or driver group (e.g., family or company) may earn an award, for example. In some embodiments, the incentive data stored in the database 340 may be sorted, ranked, filtered, and/or otherwise processed to facilitate resolution of awards and/or incentives (e.g., to determine game results).

III. AI Driving Analysis and Incentive Processes

Figure 4:
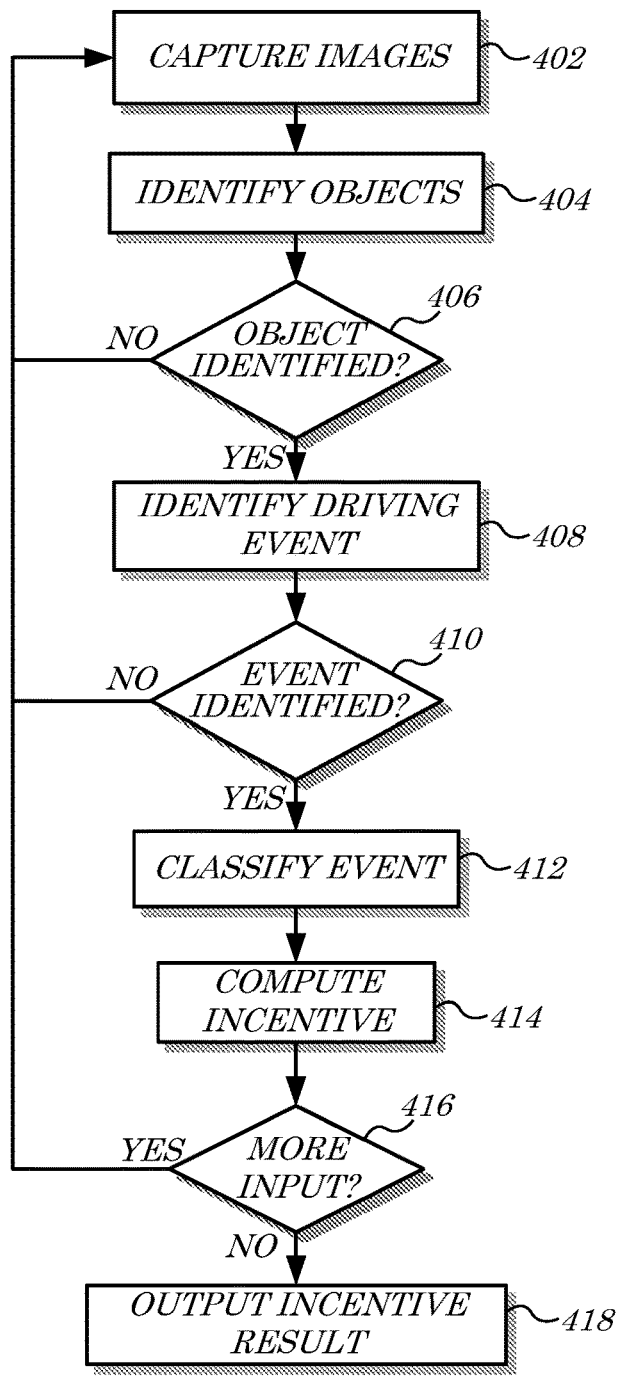
FIG. 4 is a flow diagram of a method according to some embodiments.

Referring now to FIG. 4, a flow diagram of a method 400 according to some embodiments is shown. In some embodiments, the method 400 may be performed and/or implemented by and/or otherwise associated with one or more specialized and/or specially-programmed computers (e.g., the user devices 102, 202, 502, the third-party device 108*a*, the servers 108*b*, 208, 308, and/or the AI devices 110, 210, 310, 610, 710 all of FIG. 1, FIG. 2, FIG. 3A, FIG. 3B, FIG. 5A, FIG. 5B, FIG. 5C, FIG. 6, and/or FIG. 7 herein), computer terminals, computer servers, computer systems and/or networks, and/or any combinations thereof. In some embodiments, the method 400 may be embodied in, facilitated by, and/or otherwise associated with various input mechanisms and/or interfaces (e.g., the interfaces 220, 520*a-c*, 620 of FIG. 2, FIG. 5A, FIG. 5B, FIG. 5C, and/or FIG. 6 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory devices 140*a-b*, 240*a-b*, 340, 640, 740, 840*a-e* of FIG. 1, FIG. 2, FIG. 3A, FIG. 3B, FIG. 6, FIG. 7, FIG. 8A, FIG. 8B, FIG. 8C, FIG. 8D, and/or FIG. 8E herein) may store thereon instructions that when executed by a machine (such as a computerized processor) result in performance according to any one or more of the embodiments described herein.

In some embodiments, the method 400 may comprise capturing images (and/or other data; e.g., by a sensor and/or camera device), at 402. An AI device configured to look similar to a dash-cam device may, for example, be installed in a vehicle (e.g., mounted to a windshield or air vent and/or oriented to have a view through the windshield) to analyze driving behaviors of one or more drivers of the vehicle. In accordance with some embodiments, the driver may comprise a young or inexperienced driver for whom safe driving incentives are particularly desirable (e.g., since such drivers are more likely to experience accidents). According to some embodiments, the AI device may comprise a Graphics Processing Unit (GPU) to permit real-time analysis of captured data, and AI processing logic and/or algorithms for analyzing the captured data. In some embodiments, the captured data may comprise still images, video data, audio data, and/or other sensed data descriptive of an environment surrounding the vehicle. According to some embodiments, images and/or other data captured or sensed by the camera/sensor may be sent to the GPU, which may receive and process the data (e.g., in accordance with stored (software and/or firmware) graphics processing algorithms or rules). In some embodiments, the GPU may send the processed data/images to a Central Processing Unit (CPU) or other logical device that may, for example, receive and process the GPU-processed data/images, e.g., in accordance with stored AI instructions.

According to some embodiments, the method 400 may comprise identifying objects (e.g., via AI analysis performed by a CPU and/or processing device), at 404. AI instructions may comprise one or more object detection algorithms, for example, that are coded to identify various types of objects in the environment of the vehicle, such as, but not limited to, other vehicles, bicycles, pedestrians, animals, roadway obstructions, detours, road construction sites, roadway features (such as turns, hills, dips, bridges, cracks, potholes), trees, road signs, billboards, curbs, guardrails, lane and/or other roadway markings, such as centerlines, shoulder lines, passing zones, intersections, and traffic control devices (e.g., traffic lights, speedbumps). Object detection algorithms may generally store predefined shapes, colors, and/or patterns that the AI device may utilize to search through captured images to identify occurrences of such shapes, colors, and/or patterns, and thereby identify one or more objects. According to some embodiments, identified objects may be classified into different types, such as road signs, other vehicles, pedestrians, traffic control signals, etc. According to some embodiments, information may be acquired from various identified objects, such as speed limits (from speed limit signs), school zones (from school zone signs), traffic light colors, and/or locations (e.g., based on street signs, billboards, telephone pole identifiers, roadway mileage markers, license plates, business signage, and/or topographic features).

In some embodiments, the method 400 may comprise determining (e.g., by the CPU/processing device) whether objects have been identified, at 406. In the case that no objects have been identified (and/or additional objects should be identified), the method 400 may proceed back to capture more images at 402 (and/or to identify more objects at 404). In the case that at least one object has been identified (at 404) and/or no additional objects should be identified, the method 400 may proceed to and/or comprise identifying (e.g., by the CPU/processing device) a driving event, at 408. AI driving analysis code may comprise, for example, code that when executed by a processing device is operable to identify various driving-related (or other vehicle operation-related) events, occurrences, status, and the like. In the case that the AI analysis identifies an object, such as a wet roadway (at 404), for example, the speed and/or driving actions of the vehicle/driver may be monitored across the stretch of wet roadway to determine that the driver/vehicle has traversed a wet roadway object. Similarly, in the case a stop light emitting a red light is identified, a "stop at red light" driving event may be identified and/or classified. According to some embodiments, various types of object-based and/or other data may be captured and/or stored in temporal conjunction with the classified driving event.

According to some embodiments, the method 400 may comprise determining (e.g., by the CPU/processing device) whether driving events have been identified, at 410. In the case that no driving events have been identified (and/or additional driving events should be identified), the method 400 may proceed back to capture more images at 402 (and/or to identify more driving events at 408). In the case that at least one driving event has been identified (at 408) and/or no additional driving events should be identified, the method 400 may proceed to and/or comprise classifying (e.g., by the CPU/processing device) a driving event, at 412. AI driving analysis code may comprise, for example, code that when executed by a processing device is operable to classify various driving-related (or other vehicle operation-related) events, occurrences, status, and the like. Data captured during the driver's traversal of a wet roadway may, for example, be analyzed to determine that the driver conducted the traversal in a particular fashion (e.g., too fast, slowly, erratically, cautiously—e.g., gentle turns or lane changes). Similarly, in the case that another vehicle has been identified in front of the driver's vehicle (e.g, via the object detection at 404) and a "following distance" driving event has been identified (e.g., at 408), an object-based distance between the two vehicles may be calculated and compared to a threshold distance (e.g., a speed-variable threshold distance) to determine whether the driver is following too closely or not. In such a manner, for example, various driving events may be classified based on captured, sensed, and/or computed data by categorizing the driver/vehicle actions related to the event as "Safe" or "Unsafe" (e.g., a qualitative metric) and/or may correlate classifications to points, scores, and/or other qualitative metrics (e.g., each "safe" driving event classification may equate to an addition of ten (10) points to the driver's score or point total).

In some embodiments, the method 400 may comprise computing (e.g., by the CPU/processing device and/or by a server device and/or a mobile device application) an incentive, at 414. AI driving analysis and/or incentive instructions or code may, for example, correlate various point, score, rank, and/or other qualitative and/or quantitative thresholds to points, scores, etc., earned or allocated to a driver (and/or vehicle). A certain number of "safe" stops (e.g., at an identified stop sign object) may qualify a driver for a particular award, bonus, discount, and/or other incentive, for example, and/or a total point score above five hundred (500) points (or other threshold) may qualify a driver for entry into a sweepstakes, drawing, and/or other chance of winning a prize. In some embodiments, point totals, scores, and/or other quantitative metrics for a driver may be maintained as a running total that is updated upon classifying of additional driving events (e.g., at 412). According to some embodiments, one or more incentives/awards may be at least partially based on a comparison of the driver's performance with the performances of other drivers (e.g., for a particular time period). In some embodiments, a group of drivers (e.g., in the same class at school, in the same family, employed by the same employer, a team of drivers, etc.) may compete among themselves in a competitive game where the highest-ranking/scoring driver(s) receives an award or prize, for example, and/or different groups of drivers may compete in a competitive game where the cooperative cumulative scores of team members are compared to determine a winning team (e.g., each member of which may be provided with an award). Awards or incentives may comprise any type of consideration and/or value objects that are or become known or practicable, such as, but not limited to: monetary awards, discounts (percentage or dollar amount), free products, free services, account points (e.g., airlines miles, frequent shopper points, credit card points), and/or rights to use various badges, logos, etc. (e.g., "Best Teen Driver Award").

According to some embodiments, the method 400 may comprise determining (e.g., by the CPU/processing device) whether there is (or should be) more input, at 416. In the case that no objects and/or driving events have been identified (and/or additional driving events and/or objects should be identified), for example, the method 400 may proceed back to capture more images at 402 (and/or identify more driving events at 408 and/or identify more objects at 404). In some embodiments, AI driving analysis and/or incentive provision may be time-based. A safe driving competition, game, and/or program may run for a week, month, seasonally, or for a different time period or window, for example. In such embodiments, the capturing of images/data at 402 may proceed and/or be repeated until it is determined (e.g., at 416) that the time period/window has closed.

In the case that no more input is available and/or needed, the method 400 may proceed to output an indication of the incentive result, at 418. In some embodiments, the AI device may comprise an output device, such as a display screen and/or speaker, via which incentive progress and/or overall results (e.g., at the close of a time window) may be output to a driver. According to some embodiments, the AI device may comprise a short-range communication device operable to transmit an indication of the incentive status and/or result to the vehicle and/or to a mobile electronic device (e.g., a smart phone) utilized by a driver thereof). In some embodiments, the result/status may be output via a webpage served by a web server in communication with the AI device and, e.g., displayed via a user's mobile device. According to some embodiments, a specially programmed mobile device application of a user's device may be coded to receive incentive data from the AI device and/or from a server (e.g., a game server) that operates in conjunction therewith. In some embodiments, the outputting of incentive data may be conducted only in the case that the vehicle is determined to not be in motion and/or in the case that a connected output device, such as a mobile phone, is not positioned within the vehicle. In such a manner, for example, the AI device may limit interaction to prevent distracting the driver. According to some embodiments, such as in the case that a mobile device application in communication with the AI device is utilized, the mobile device application (or "app") may disable or silence the mobile device during vehicle operation. The AI device may utilize object detection to determine that the vehicle is being operated, for example, and may send a command that disables the mobile device's ringer, speaker, vibration feature, powers down the mobile device, etc. In some embodiments, such functionality may be realized and/or enhanced by plugging the mobile device into the AI device via a cable or wire and/or positioning the mobile device in a cradle or mount on the AI device. According to some embodiments, the AI device may not function (i.e., may not execute the method 400) unless the user's mobile device is cradled, powered down, put in sleep mode, running the dedicated mobile app, and/or hardwire connected.

IV. AI Driving Analysis and Incentive Interfaces

Figure 5A:
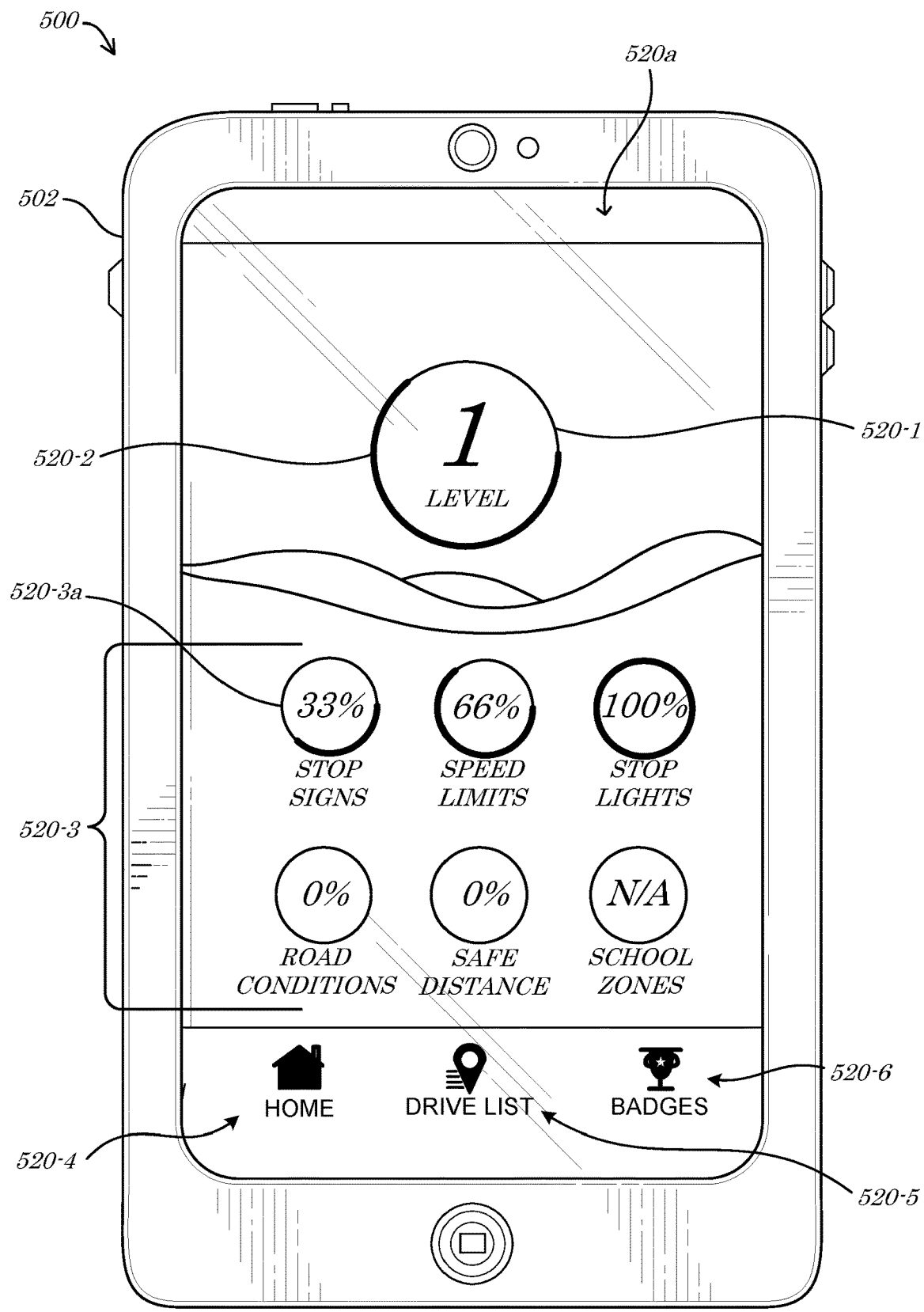
FIG. 5A, FIG. 5B, and FIG. 5C are diagrams of an example interface system according to some embodiments.
Figure 5B:
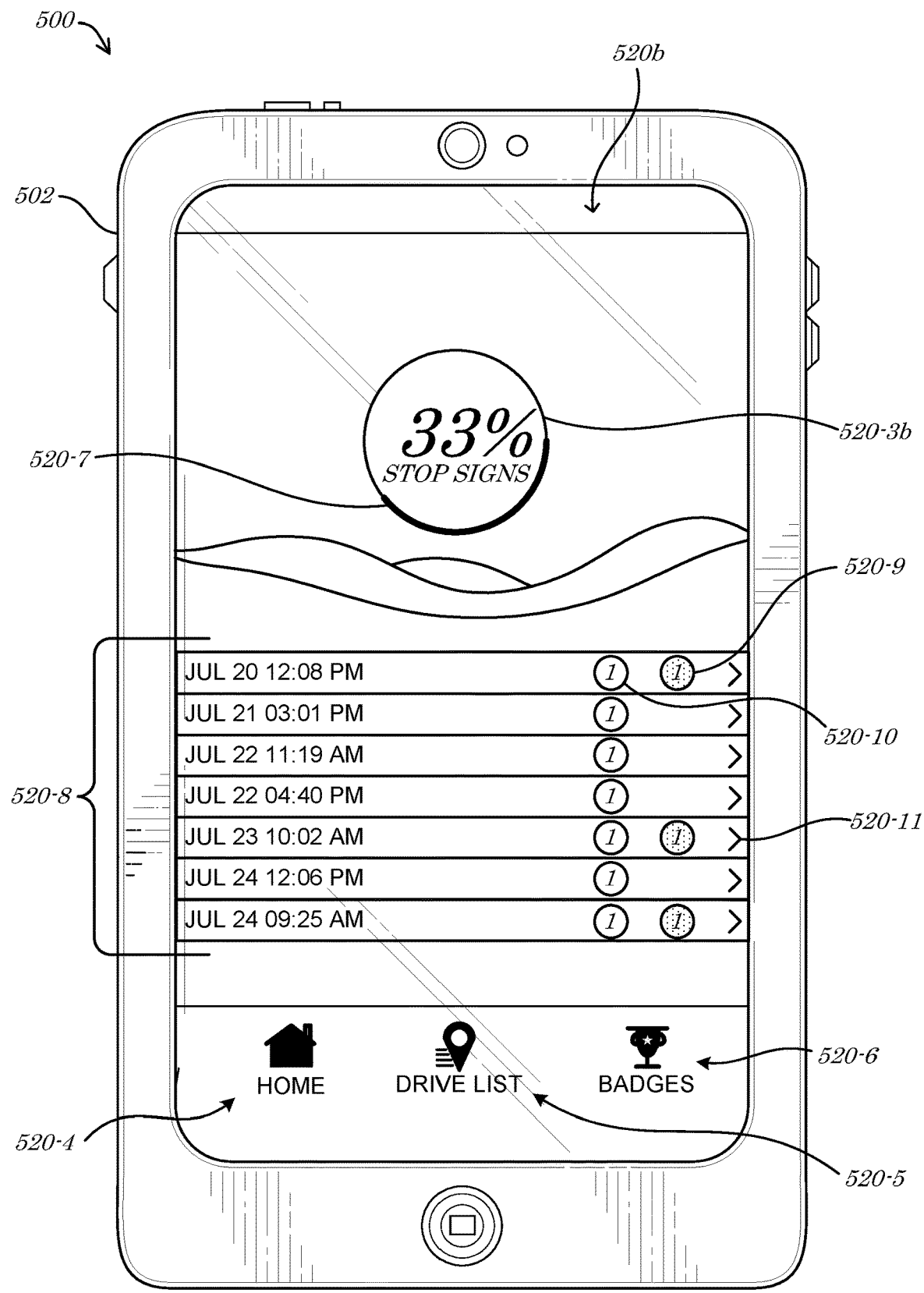
Figure 5C:
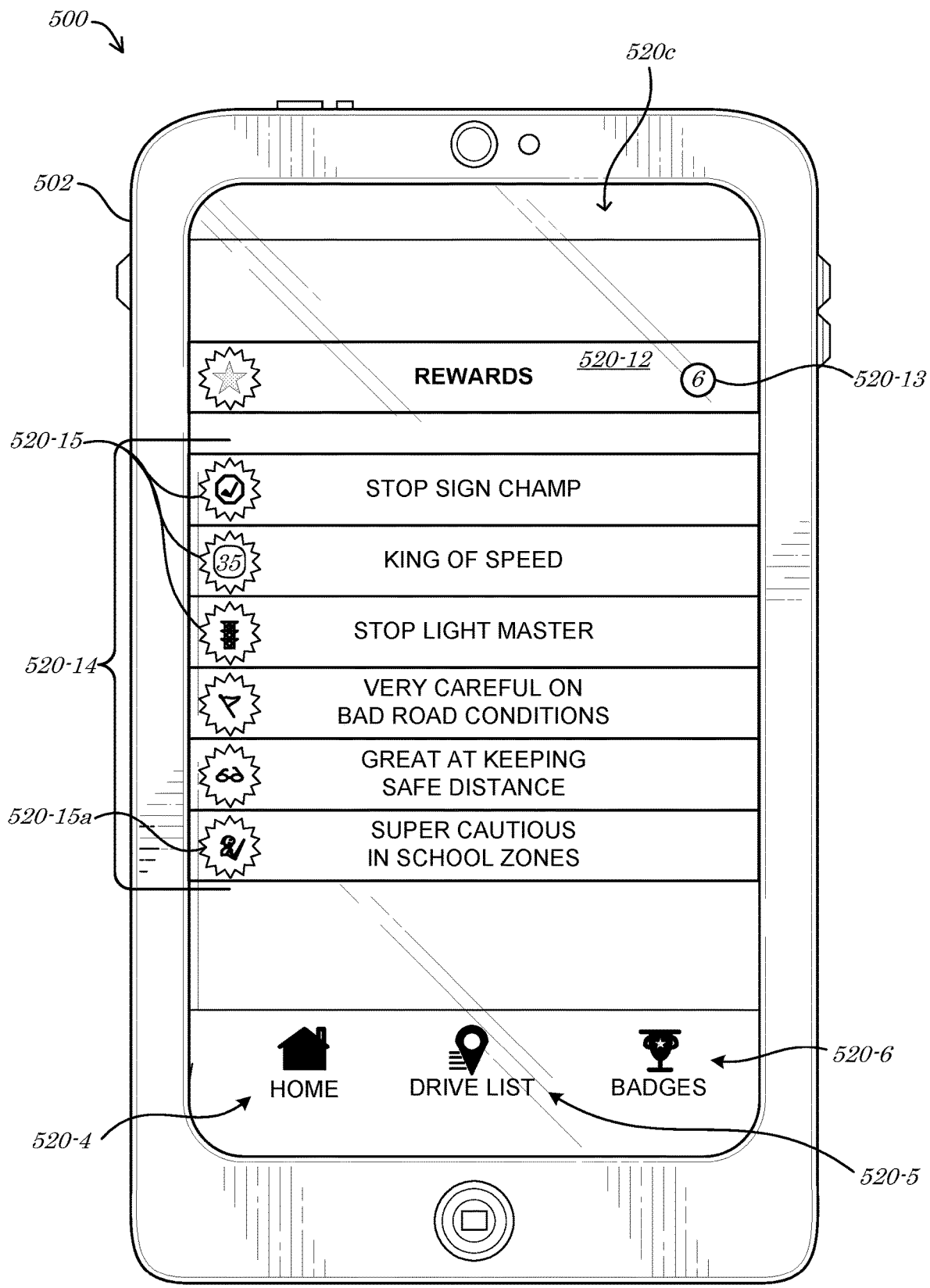

Turning now to FIG. 5A, FIG. 5B, and FIG. 5C, a diagram of an example interface system 500 according to some embodiments are shown. In some embodiments, the interface system 500 may comprise a mobile electronic user device 502 that outputs one or more interfaces 520a-c. According to some embodiments, the interfaces 520a-c may comprise one or more of a web page, web form, database entry form, API, spreadsheet, table, and/or application or other GUI via which a user or other entity may receive and/or enter data (e.g., provide or define input) in association with AI driving analysis and incentivization, as described herein. The interfaces 520a-c may, for example, comprise a front-end of an AI driving analysis and incentive program and/or platform programmed and/or otherwise configured to execute, conduct, and/or facilitate the method 400 of FIG. 4 herein, and/or portions thereof. In some embodiments, the interface 520a-c may be output via one or more computerized and/or specially-programmed computers (e.g., the user devices 102, 202, 502, the vehicles 106, 206, 306, the third-party device 108a, the servers 108b, 208, 308, and/or the AI devices 110, 210, 310, 610, 710 all of FIG. 1, FIG. 2, FIG. 3A, FIG. 3B, FIG. 5A, FIG. 5B, FIG. 5C, FIG. 6, and/or FIG. 7 herein), computer terminals, computer servers, computer systems and/or networks, and/or any combinations thereof (e.g., by one or more multi-threaded and/or multi-core processing units of the AI device).

According to some embodiments, the interfaces 520a-c may comprise one or more tabs and/or other segmented and/or logically-presented data forms and/or fields. In some embodiments, the interfaces 520a-c may be configured and/or organized to allow and/or facilitate viewing, retrieval, and/or selection of various object identification, driving event identification and/or classification, and/or incentive/award data, e.g., for a particular driver, group of drivers, and/or vehicle or group of vehicles (e.g., a fleet). According to some embodiments, the interfaces 520a-c may comprise a menu or "home" page from which a user may select one or more options that initiate specific functionality of a mobile device application. As depicted in FIG. 5A, for example, a first version (or page or instance) of the interface 520a may comprise a "Menu" or "Home Page" interface (e.g., defining a first input and/or output mechanism) that provides and/or includes an incentive status indicator 520-1, an incentive progress status indicator 520-2, a plurality of driving event progress and/or status indicators 520-3, a home button 520-4, a drive list button 520-5, and/or a badges button 520-6 (e.g., each of which may comprise one or more data entry mechanisms, tools, objects, and/or features).

In some embodiments, the first version (or page or instance) of the interface 520a may be utilized by a user (such as a young and/or inexperienced driver) to readily access and understand how their driving activities have affected progress toward one or more goals, awards, and/or other incentives (e.g., levels of progress, such as the "1 Level" displayed in the incentive status indicator 520-1). Data acquired and analyzed by an AI device in the user's vehicle (none of which are shown in FIG. 5A, FIG. 5B, or FIG. 5C) may, for example, be utilized to compute incentive status, level, progress, and/or awards and may be provided (e.g., through the first version of the interface 520a) to the user. The first version of the interface 520a may readily output, for example, (i) the current level of progress of the user (via the incentive status indicator 520-1) in a tiered incentive program, (ii) the progress of the user toward the next level (via the incentive progress status indicator 520-2), and/or (iii) level status, level progress, and/or statistical data (via the driving event progress and/or status indicators 520-3) descriptive of the user's performance in various driving event categories, such as a first driving event progress and/or status indicator 520-3a that shows that the user/driver has performed proper stops at only thirty-three percent (33%) of stop signs encountered. In accordance with embodiments as described herein, such statistical and/or incentive data may be derived and/or calculated by an AI driving analysis and incentive device via execution of AI-based object detection, analysis, and/or event classification algorithms stored therein.

In some embodiments, the user may be able to drill-down into any desired statistical, driving analysis, and/or incentive metric or category to retrieve more and/or different data. According to some embodiments, each of the driving event progress and/or status indicators 520-3 may, upon a triggering and/or receipt of input from the user (e.g., a properly-positioned click of a mouse or other pointer) with respect to one or more of the driving event progress and/or status indicators 520-3, trigger a call to and/or otherwise cause a provision, generation, and/or outputting of different versions of the first interface 520a. A user selection the first driving event progress and/or status indicator 520-3a (e.g., "33% Stop Signs") and/or a selection of the drive list button 520-5, may trigger generation and/or outputting of a second version of the interface 520b as depicted in FIG. 5B, for example, that provides a driving category details interface or platform. According to some embodiments (and turning to FIG. 5B), the second version of the interface 520b may comprise a second version of the first driving event progress and/or status indicator 520-3b, a first driving event progress indicator 520-7, a listing of specific driving events 520-8 (e.g., of the same driving event class—such as related to stopping at stop signs), one or more positive event counters 520-9, one or more negative event counters 520-10, and/or data view buttons 520-11.

According to some embodiments, the second version of the first driving event progress and/or status indicator 520-3b may comprise an indication of a statistical (or other mathematical) metric descriptive of a particular class of driving event, such as the "stop signs" event depicted for purposes of non-limiting example in FIG. 5B. The second version of the first driving event progress and/or status indicator 520-3b may, for example, output an indication of a percentage of times (e.g., during a particular time period) that the driver has conducted proper stops at stop signs. In the example case shown, the driver has only executed proper stops thirty-three percent (33%) of the time. According to some embodiments, the first driving event progress indicator 520-7 may comprise a status bar, such as the circumferential status bar shown, that provides a graphical representation of the statistical metric. In some embodiments, the listing of specific driving events 520-8 may provide trip and/or time-based details descriptive of driving event occurrences. The listing of specific driving events 520-8 may include, for example, a date and/or time of the event, a location of the event, and/or other details of the event. As the second version of the interface 520b may only, in some embodiments, be provided to the driver/user themselves, the storing and/or outputting of detailed data, such as times and locations may be kept in confidence, thereby maintaining the privacy of the driver.

In some embodiments, the listing of specific driving events 520-8 may comprise and/or be associated with any or all of the positive event counters 520-9, negative event counters 520-10, and/or data view buttons 520-11. The positive event counters 520-9 may be utilized to provide graphical depictions of proper stop event classifications (e.g., good driving events), for example, while the negative event counters 520-10 may be utilized to provide graphical depictions of improper stop event classifications (e.g., bad driving events). According to some embodiments, a data view button 520-11 corresponding to any given event in the listing of specific driving events 520-8 may be selected to access any raw data or other more detailed information regarding the event. The data view buttons 520-11 may, for example, link to and/or load any captured images, video, and/or other data upon which the driving event classifications have been based. In such a manner, the driver/user may review the analyzed events to identify any potential errors. In some embodiments, the user may be able to contest classification and/or report errors directly through the interfaces 520a-c and/or the system 500.

According to some embodiments, user selection of the badges button 520-6 (from either or both of the first and second versions of the interface 520*a-b*) may trigger generation and/or outputting of a third version of the interface 520*c* as depicted in FIG. 5C. The third version of the interface 520*c* may comprise, for example, a rewards indicator 520-12, a rewards counter 520-13, and/or a rewards list 520-14. The rewards indicator 520-12 may comprise an indication of and/or link to any awards or incentives (e.g., the rewards list 520-14) that have been (or could be) earned by a driver/user. In some embodiments, the rewards counter 520-13 may provide an indication of a total amount, type, and/or value (e.g., point value or monetary value) of any earned and/or available awards. As depicted for non-limiting purposes of example in FIG. 5C, for example, the rewards counter 520-13 may indicate six (6) awards that correspond to the items in the detailed rewards list 520-14. According to some embodiments, the rewards list 520-14 may provide various details regarding award or incentive status, value, type, and/or details regarding earning the award, such as which type(s) of driving event classification an award corresponds to (e.g., how the award was earned), what statistical or other mathematical metric (e.g., fifty percent (50%)) is required to achieve an award, how many more points a driver needs to obtain a reward, and/or tips on how the driver can obtain an award (e.g., what constitutes a complete stop at a stop sign and/or a description of why certain actions by the driver have not been positively categorized).

In some embodiments, any or each award listed in the rewards list 520-14 may comprise a badge 520-15. The badges 520-15 may, for example, comprise different icons, graphics, and/or other representations of the awards/incentives earned by the driver. The driver may strive to collect badges 520-15 as indications of good driving, for example, and/or may compete with other drivers in collecting badges 520-15 and/or series or groups of badges 520-15. According to some embodiments, the badges 520-15 and/or the specific awards in the rewards list 520-14 may represent and/or link to one or more associated monetary and/or physical prizes. User selection of a first award or badge 520-15*a* listed in the rewards list 520-14 (e.g., the "Super Cautious in School Zones" badge) may, for example, provide access to and/or reveal a particular monetary amount, a discount, a free unit of product, a free or discounted service, and/or another incentive that is specifically correlated to the earning of the first award/badge 520-15*a*. According to some embodiments, available and/or earned awards or incentives may be based on a location of the vehicle, driver, and/or event(s) associated with the classified driving activity associated with the award/incentive. To incentivize safer speeds outside of or near a local business, for example, the local business may sponsor an award for drivers that maintain speeds within safe driving thresholds for a certain stretch of road or for a certain area (e.g., within a certain postal code or distance radius from the business). In such a manner, for example, certain awards/incentives may be subsidized by various entities, such as entities that comprise some nexus (e.g., geographic location) to monitored and analyzed driving activities. In addition to or instead or incentives and/or badges 520-15, recommendations (not shown) may be provided to assist the driver in improving specific habits and/or driving characteristics.

While various components of the interfaces 520*a-c* have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

V. AI Driving Analysis and Incentive Apparatus and Articles of Manufacture

Figure 6:
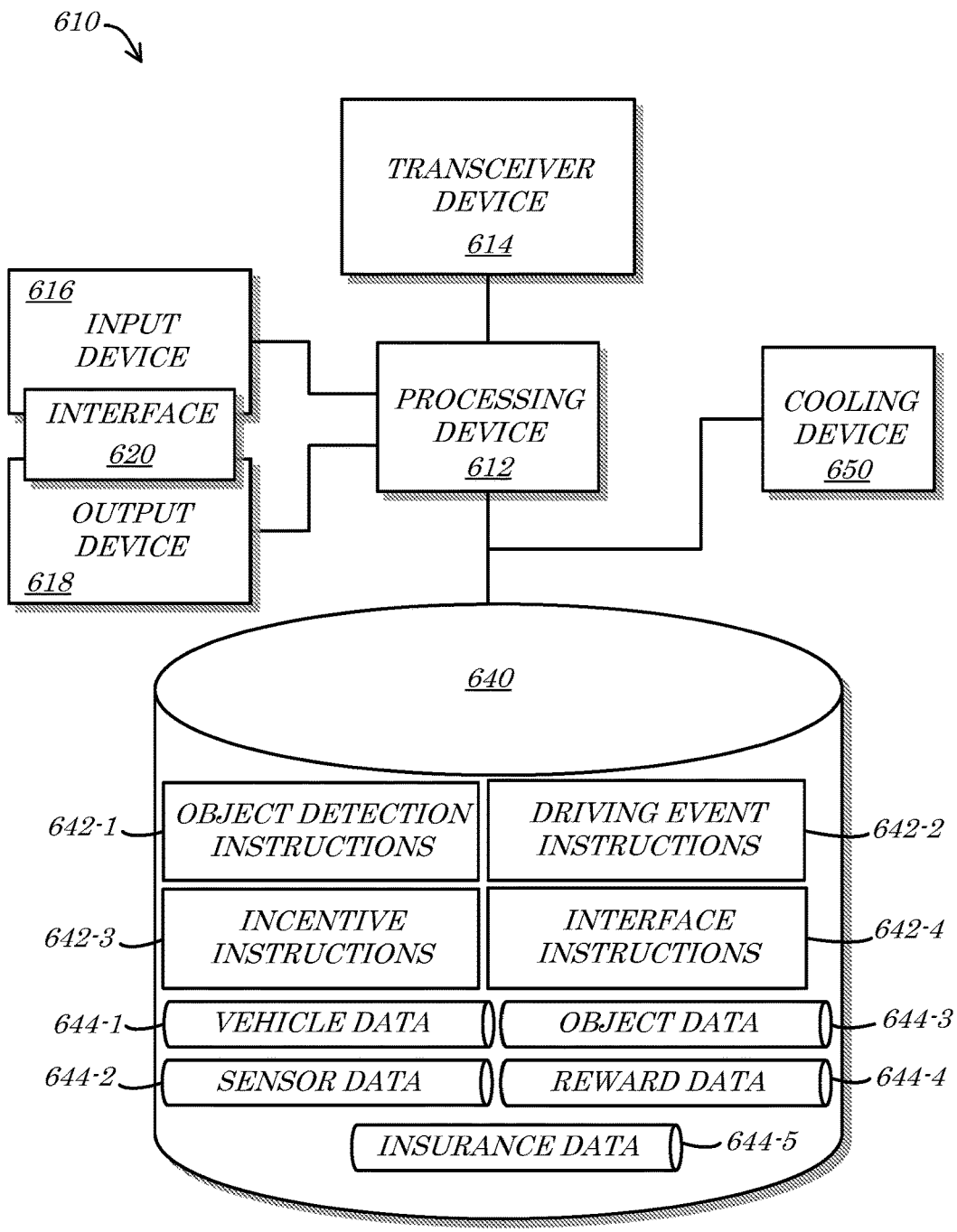
FIG. 6 is a block diagram of an apparatus according to some embodiments.

Turning to FIG. 6, a block diagram of an AI device or other apparatus 610 according to some embodiments is shown. In some embodiments, the apparatus 610 may be similar in configuration and/or functionality to any of the user devices 102, 202, 502, the third-party device 108*a*, the servers 108*b*, 208, 308, and/or the AI devices 110, 210, 310, 710 all of FIG. 1, FIG. 2, FIG. 3A, FIG. 3B, FIG. 5A, FIG. 5B, FIG. 5C, and/or FIG. 7 herein. The apparatus 610 may, for example, execute, process, facilitate, and/or otherwise be associated with the method 400 of FIG. 4 herein, and/or portions thereof. In some embodiments, the apparatus 610 may comprise a processing device 612, a transceiver device 614, an input device 616, an output device 618, an interface 620, a memory device 640 (storing various programs and/or instructions 642 and data 644), and/or a cooling device 650. According to some embodiments, any or all of the components 612, 614, 616, 618, 620, 640, 642, 644, 650 of the apparatus 610 may be similar in configuration and/or functionality to any similarly named and/or numbered components described herein. Fewer or more components 612, 614, 616, 618, 620, 640, 642, 644, 650 and/or various configurations of the components 612, 614, 616, 618, 620, 640, 642, 644, 650 be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E6501 chipset. In some embodiments, the processor 612 may comprise multiple inter-connected processors, microprocessors, and/or micro-engines. According to some embodiments, the processor 612 (and/or the apparatus 610 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 610 comprises a server, such as a blade server, necessary power may be supplied via a standard AC outlet, power strip, surge protector, and/or Uninterruptible Power Supply (UPS) device.

In some embodiments, the transceiver device 614 may comprise any type or configuration of communication device that is or becomes known or practicable. The transceiver device 614 may, for example, comprise a Network Interface Card (NIC), a telephonic device, a cellular network device, a router, a hub, a modem, and/or a communications port or cable. According to some embodiments, the transceiver device 614 may also or alternatively be coupled to the processor 612. In some embodiments, the transceiver device 614 may comprise an IR, RF, Bluetooth™, Near-Field Communication (NFC), and/or Wi-Fi® network device coupled to facilitate communications between the processor 612 and another device (not shown).

According to some embodiments, the input device 616 and/or the output device 618 may be communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., a driver, such as to retrieve AI driving analysis incentive data, as described herein). The output device 618 may, according to some embodiments, comprise a display screen and/or other practicable output component and/or device. The output device 618 may, for example, provide an interface (such as the interface 620 and/or the interfaces 220, 520a-c of FIG. 2, FIG. 5A, FIG. 5B, and/or FIG. 5C herein) via which AI driving analysis and/or incentive data or information is provided to a user (e.g., via a website and/or mobile application). According to some embodiments, the input device 616 and/or the output device 618 may comprise and/or be embodied in a single device, such as a touch-screen monitor or display.

The memory device 640 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of object detection instructions 642-1, driving event instructions 642-2 (e.g., detection and/or classification), incentive instructions 642-3, interface instructions 642-4, vehicle data 644-1, sensor data 644-2, object data 644-3, reward data 644-4, and/or insurance data 644-5. In some embodiments, the object detection instructions 642-1, driving event instructions 642-2, incentive instructions 642-3, interface instructions 642-4, vehicle data 644-1, sensor data 644-2, object data 644-3, reward data 644-4, and/or insurance data 644-5 may be utilized by the processor 612 to provide output information via the output device 618 and/or the transceiver device 614.

According to some embodiments, the object detection instructions 642-1 may be operable to cause the processor 612 to process vehicle data 644-1, sensor data 644-2, object data 644-3, reward data 644-4, and/or insurance data 644-5 in accordance with embodiments as described herein. Vehicle data 644-1, sensor data 644-2, object data 644-3, reward data 644-4, and/or insurance data 644-5 received via the input device 616 and/or the transceiver device 614 may, for example, be analyzed, sorted, filtered, decoded, decompressed, ranked, scored, plotted, and/or otherwise processed by the processor 612 in accordance with the object detection instructions 642-1. In some embodiments, vehicle data 644-1, sensor data 644-2, object data 644-3, reward data 644-4, and/or insurance data 644-5 may be fed by the processor 612 through one or more mathematical and/or statistical formulas and/or models in accordance with the object detection instructions 642-1 to analyze captured data, such as captured image data descriptive of an environment in which a vehicle is disposed, to identify one or more objects, as described herein.

In some embodiments, the driving event instructions 642-2 may be operable to cause the processor 612 to process the vehicle data 644-1, sensor data 644-2, object data 644-3, reward data 644-4, and/or insurance data 644-5 in accordance with embodiments as described herein. Vehicle data 644-1, sensor data 644-2, object data 644-3, reward data 644-4, and/or insurance data 644-5 received via the input device 616 and/or the transceiver device 614 may, for example, be analyzed, sorted, filtered, decoded, decompressed, ranked, scored, plotted, and/or otherwise processed by the processor 612 in accordance with the driving event instructions 642-2. In some embodiments, vehicle data 644-1, sensor data 644-2, object data 644-3, reward data 644-4, and/or insurance data 644-5 may be fed by the processor 612 through one or more mathematical and/or statistical formulas and/or models in accordance with the driving event instructions 642-2 to identify one or more driving events (e.g., based on object analysis) and/or classify the one or more driving events, as described herein.

According to some embodiments, the incentive instructions 642-3 may be operable to cause the processor 612 to process the vehicle data 644-1, sensor data 644-2, object data 644-3, reward data 644-4, and/or insurance data 644-5 in accordance with embodiments as described herein. Vehicle data 644-1, sensor data 644-2, object data 644-3, reward data 644-4, and/or insurance data 644-5 received via the input device 616 and/or the transceiver device 614 may, for example, be analyzed, sorted, filtered, decoded, decompressed, ranked, scored, plotted, and/or otherwise processed by the processor 612 in accordance with the incentive instructions 642-3. In some embodiments, vehicle data 644-1, sensor data 644-2, object data 644-3, reward data 644-4, and/or insurance data 644-5 may be fed by the processor 612 through one or more mathematical and/or statistical formulas and/or models in accordance with the incentive instructions 642-3 to define one or more reward and/or incentive levels, tiers, points, rankings, prizes, awards, and/or incentives, as described herein.

In some embodiments, the interface instructions 642-4 may be operable to cause the processor 612 to process the vehicle data 644-1, sensor data 644-2, object data 644-3, reward data 644-4, and/or insurance data 644-5 in accordance with embodiments as described herein. Vehicle data 644-1, sensor data 644-2, object data 644-3, reward data 644-4, and/or insurance data 644-5 received via the input device 616 and/or the transceiver device 614 may, for example, be analyzed, sorted, filtered, decoded, decompressed, ranked, scored, plotted, and/or otherwise processed by the processor 612 in accordance with the interface instructions 642-4. In some embodiments, vehicle data 644-1, sensor data 644-2, object data 644-3, reward data 644-4, and/or insurance data 644-5 may be fed by the processor 612 through one or more mathematical and/or statistical formulas and/or models in accordance with the interface instructions 642-4 to provide an interface (such as the interfaces 220, 520a-c of FIG. 2, FIG. 5A, FIG. 5B, and/or FIG. 5C herein) via which input and/or output descriptive of AI driving analysis and/or incentives may be provided, as described herein.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640)

may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Figure 7:
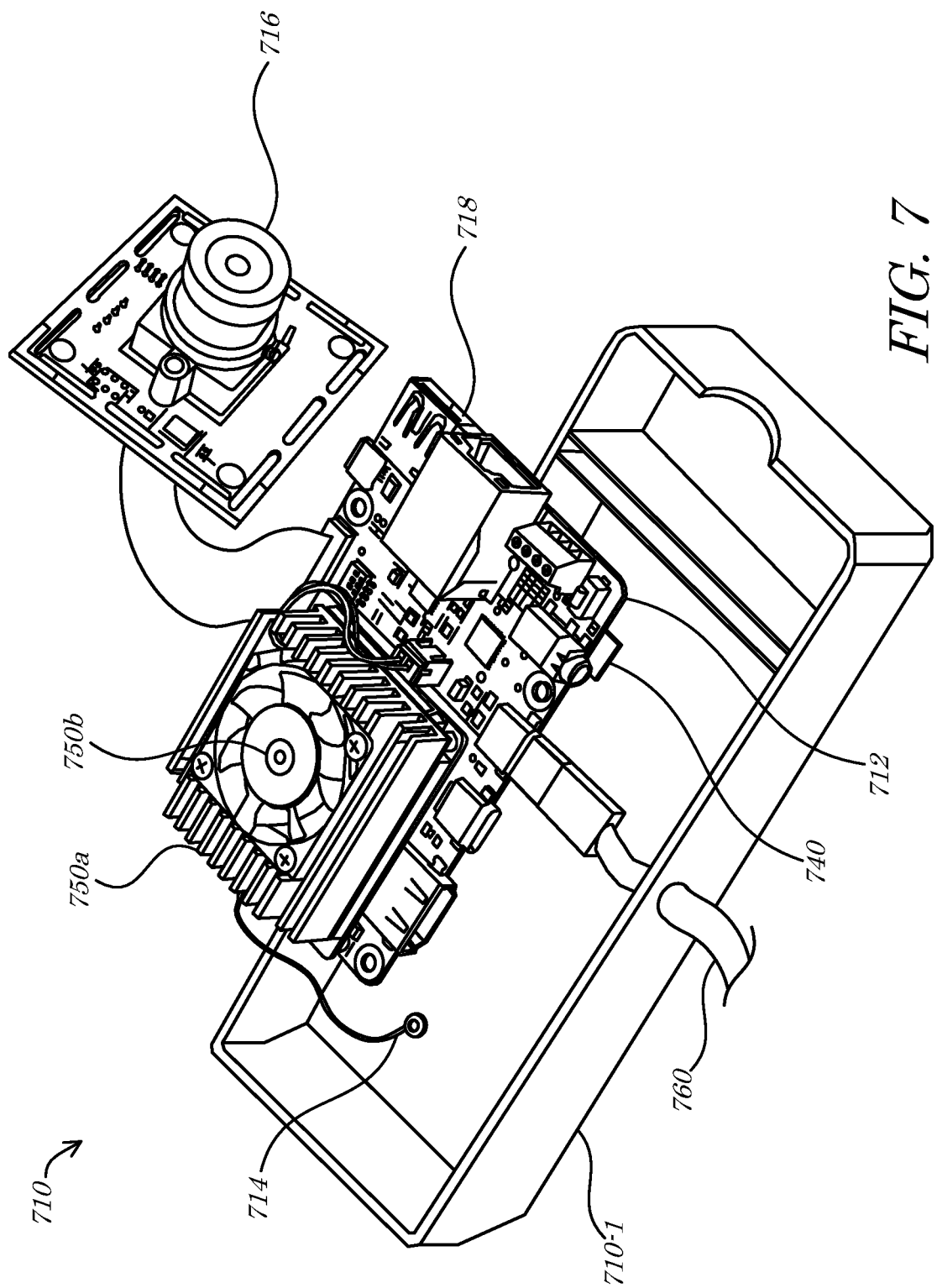
FIG. 7 is a perspective diagram of an apparatus according to some embodiments.
Figure 8A:
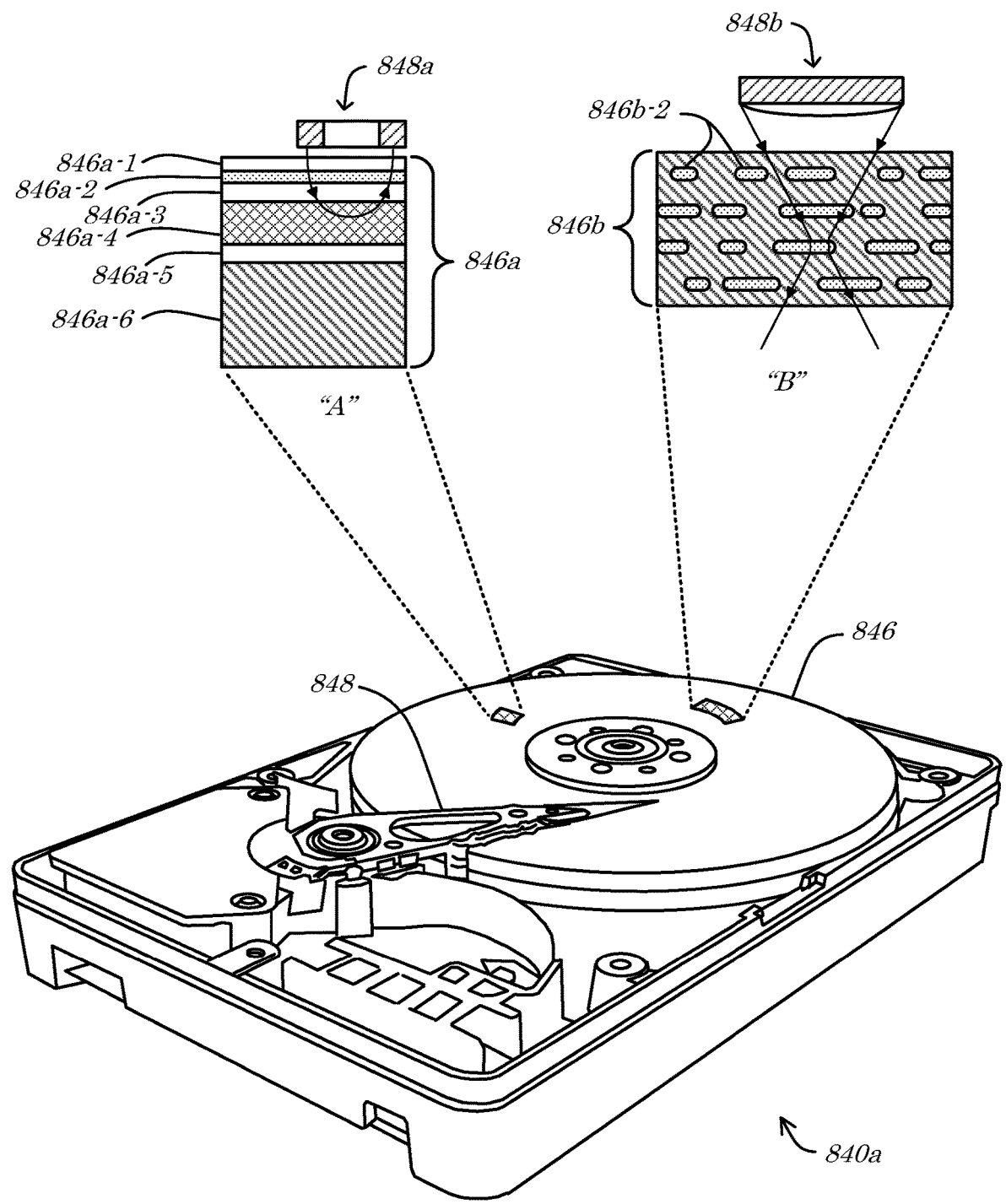
FIG. 8A, FIG. 8B, FIG. 8C, FIG. 8D, and FIG. 8E are perspective diagrams of exemplary data storage devices according to some embodiments.
Figure 8B:
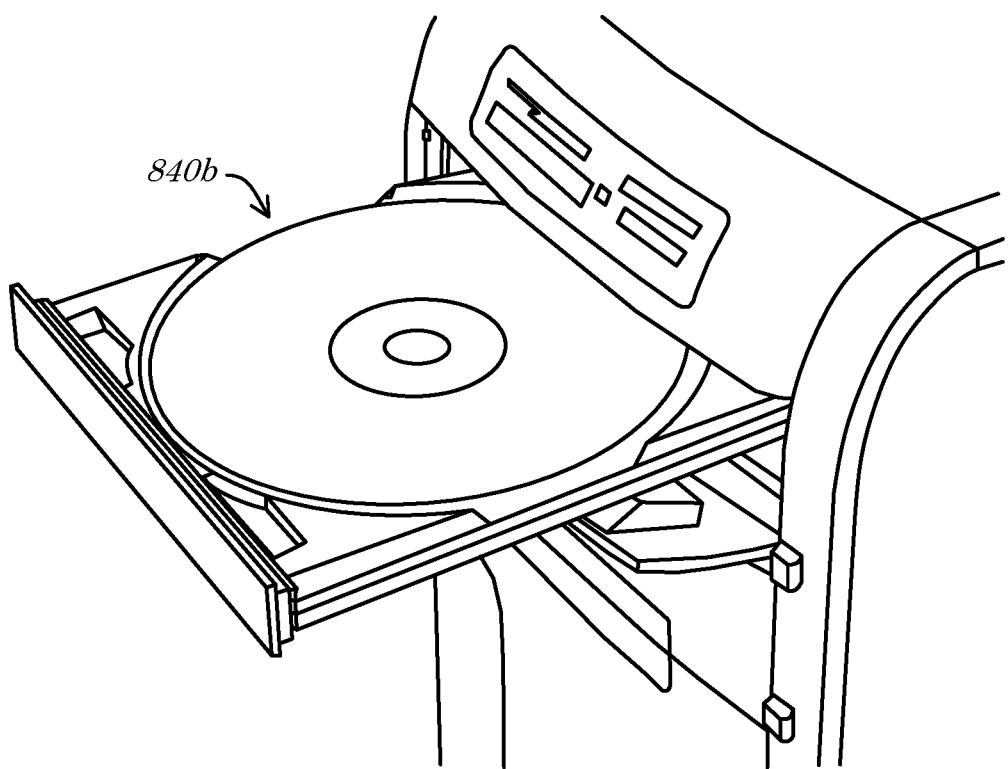
Figure 8C:
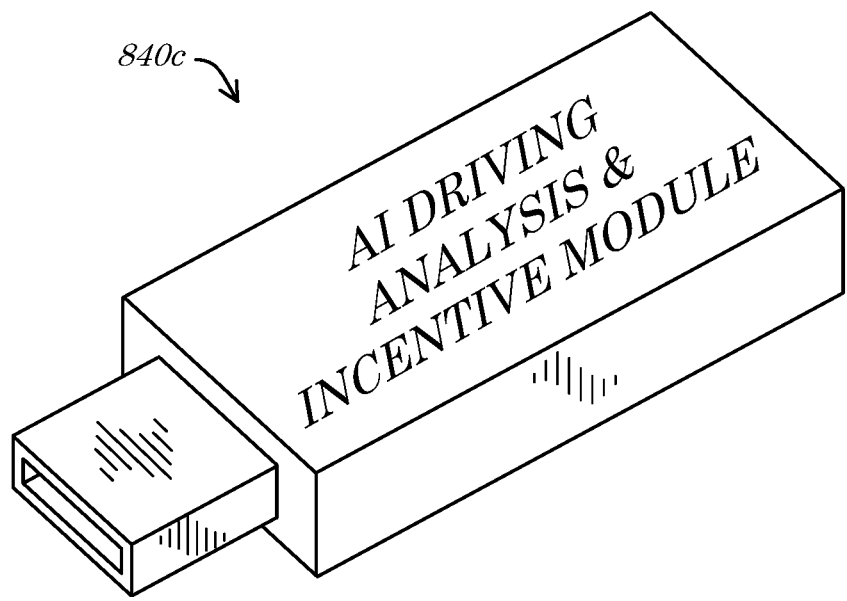
Figure 8D:
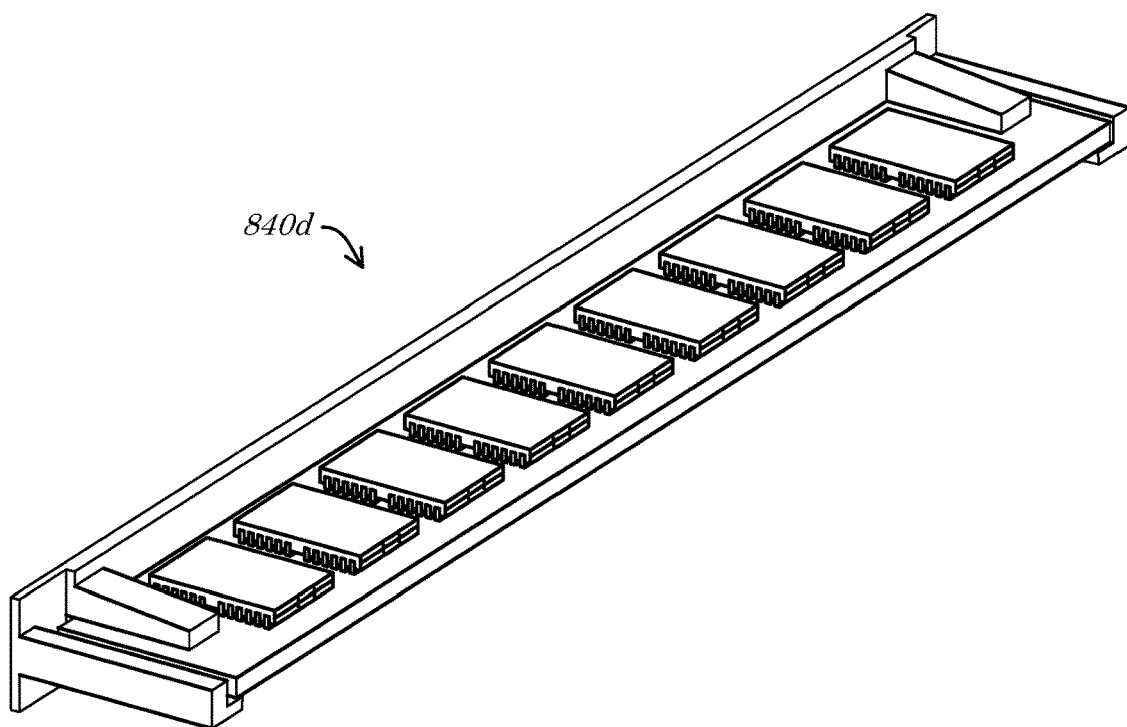
Figure 8E:
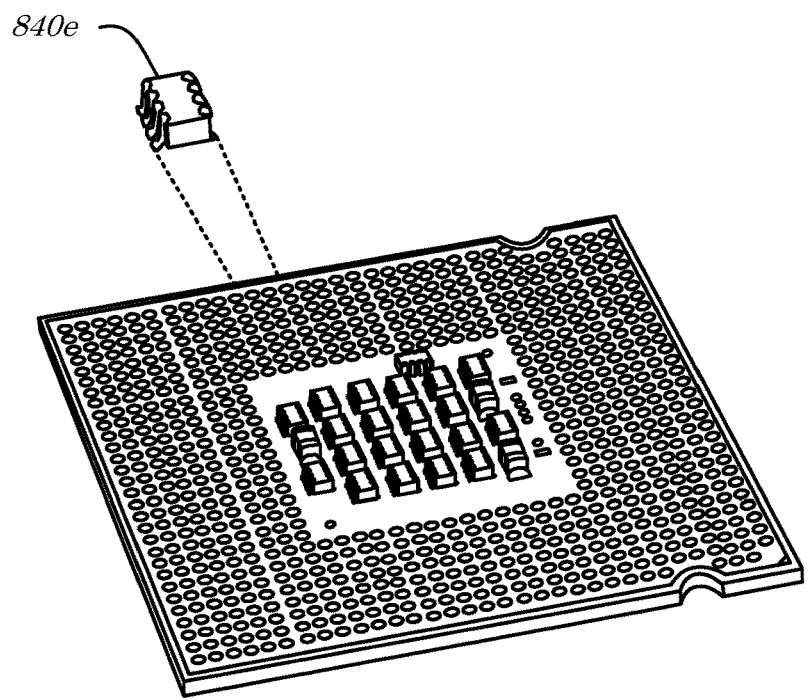

Turning to FIG. 7, a perspective diagram of an AI device or apparatus 710 according to some embodiments is shown. In some embodiments, the AI device 710 may be similar in configuration and/or functionality to any of the user devices 102, 202, 502, the third-party device 108*a*, the servers 108*b*, 208, 308, and/or the AI devices 110, 210, 310, 610 all of FIG. 1, FIG. 2, FIG. 3A, FIG. 3B, FIG. 5A, FIG. 5B, FIG. 5C, and/or FIG. 6 herein. The AI device 710 may, for example, execute, process, facilitate, and/or otherwise be associated with the method 400 of FIG. 4 herein, and/or portions thereof. In some embodiments, the AI device 710 may comprise a housing 710-1 (only a portion of which is depicted in FIG. 7 for ease of illustration), a processing device 712, a short-range communication device 714, a camera 716, an output port 718, a memory card 740 (storing various programs and/or instructions and data as described herein), a heat sink 750*a*, a cooling fan 750*b*, and/or a power supply 760. According to some embodiments, any or all of the components 710-1, 712, 714, 716, 718, 740, 750*a-b*, 760 of the AI device 710 may be similar in configuration and/or functionality to any similarly named and/or numbered components described herein. Fewer or more components 710-1, 712, 714, 716, 718, 740, 750*a-b*, 760 and/or various configurations of the components 710-1, 712, 714, 716, 718, 740, 750*a-b*, 760 be included in the AI device 710 without deviating from the scope of embodiments described herein.

In some embodiments, the AI device 710 may comprise a mobile and/or portable device operable to be removeable mounted or coupled to a vehicle (not shown). The housing 710-1 may comprise a rigid physical platform such as a metal and/or plastic clam-shell design as shown, for example, that may be mounted to a vehicle dashboard, windshield (or other window), etc. According to some embodiments, the housing 710-1 may house and/or retain the processing device 712 such as a Printed Circuit Board (PCB) embedded with various electronic components. In some embodiments, the processor 712 may comprise a Raspberry Pi™ 3 Model B+comprising a sixty-four (64) bit quad core processor chip and available from the Raspberry Pi Foundation of Cambridge, GB. According to some embodiments, such a depicted in FIG. 7 for non-limiting purposes of example, the processor 712 may comprise a Coral™ Dev Board with an NXP i.MX 8M SoC (Quad-core Cortex-A53, plus Cortex-M4F) processor, a Google® Edge™ TPU ML accelerator coprocessor (e.g., a GPU processor), an on-board cryptographic processor, and on-board Bluetooth® 4.1 module, available from Google®, Inc. of Mountain View, Calif. The processor 712 may accordingly comprise at least one of a CPU, a GPU, transceiver device, and on-board memory (none of which are separately depicted in FIG. 7).

According to some embodiments, in addition to or instead of any on-board transceiver device or communications module, the AI device 710 may comprise one or more short-range communication devices 714, such as the Bluetooth®/Wi-Fi® antenna lead depicted. In some embodiments, the camera 716 may comprise a High Definition (HD) video camera such as a Spresense™ 5 MP camera board available from FRAMOS™ Technologies, Inc. of Ottawa, Calif. or a Raspberry Pi™ Camera Module V2-8 Megapixel, 1080p available from Raspberry Pi Foundation of Cambridge, GB.

According to some embodiments, the camera 716 may comprise one or more other sensors such as an Infrared Radiation (IR) sensor, a laser rangefinder, a microwave radar sensor, a light sensor, and/or a sound sensor. In some embodiments, the output port 718 may comprise one or more ports and/or connectors for interfacing (wired or wirelessly) with external devices (not shown) such as a remote server. According to some embodiments, the memory card 740 may comprise any form, size, capacity, and/or quantity of data storage devices such as a Secure Digital (SD) memory card, a mini-SD card, or a micro-SD card available from the SanDisk® corporation of Milpitas, Calif. The memory card 740 may, alone or in combination with memory coupled to the processor 712, store various AI driving analysis rules, thresholds, criteria, algorithms, models, and/or formulas for analyzing and incentivizing safe driving as described herein.

In some embodiments, the memory card 740, any on-board memory (not visible), and/or various processing devices and/or engines, such as a CPU and/or GPU (also not visible), may be cooled by one or more of the heat sink 750*a* and the cooling fan 750*b*. Various components of the processor 712, such as one or more CPU, GPU, and/or memory modules, may, for example, be positioned beneath the heat sink 750*a* and the cooling fan 750*b* as depicted in FIG. 7. According to some embodiments, the power supply 760 may comprise a cord, cable, and/or connector operable and/or coupled to provide AC or DC electrical current to the AI device 710. As depicted in FIG. 7, the power supply 760 may comprise a power cord and connector configured in accordance with the Universal Serial Bus (USB) 3.0 Specification published on Nov. 12, 2008 by the USB Implementers Forum, Inc. of Beaverton, Oreg. In some embodiments, such as in the case that the AI device 710 is mounted in a vehicle, the power supply 760 may be coupled to provide power from the vehicle to the AI device 710. According to some embodiments, instead of or in addition to the power supply 760, the AI device 710 may be powered by one or more batteries, capacitors, and/or other electrical power sources (not shown). In some embodiments, the AI device 710 may comprise fewer or more components, e.g., that may be coupled to the housing 710-1.

According to some embodiments, the AI device 710 may comprise one or more plug-in and/or additional GPU devices (not shown) to process image data received by the camera 716. In some embodiments, the AI device 710 may comprise a GPS device or module (not shown; e.g., an Adafruit™ Ultimate GPS Breakout™ –66 channel w/10 Hz updates—Version 3 module, available from Adafruit™ Industries of New York, N.Y.) to provide another method (instead of or in addition to object-based) for location and/or movement determinations. In some embodiments, the AI device 710 may comprise an accelerometer, such as a three (3)-axis accelerometer (such as an Adafruit™ MMA8451 Triple-Axis Accelerometer available from Adafruit™ Industries of New York, N.Y.), to provide another method (instead of or in addition to object-based and/or GPS-based) for location and/or movement determinations. In some embodiments, the AI device 710 and/or housing 710-1 thereof may comprise a mobile device or cellphone cradle or dock (not shown) to provide a safe and unobtrusive storage location for a driver's cellphone while the driver is operating the vehicle. As described herein, in some embodiments such a dock/cradle may comprise a communication coupling (wired or wireless) between the cellphone and the AI device 710 such that the AI device 710 may silence, disable, or otherwise control the cellphone (or other mobile device) during vehicle operations.

Referring now to FIG. 8A, FIG. 8B, FIG. 8C, FIG. 8D, and FIG. 8E, perspective diagrams of exemplary data storage devices 840a-e according to some embodiments are shown. The data storage devices 840a-e may, for example, be utilized to store instructions and/or data, such as the object detection instructions 642-1, driving event instructions 642-2, incentive instructions 642-3, interface instructions 642-4, vehicle data 644-1, sensor data 644-2, object data 644-3, reward data 644-4, and/or insurance data 644-5, each of which is presented in reference to FIG. 6 herein. In some embodiments, instructions stored on the data storage devices 840a-e may, when executed by a processor, cause the implementation of and/or facilitate the method 400 of FIG. 4 herein, and/or portions thereof.

According to some embodiments, the first data storage device 840a may comprise one or more various types of internal and/or external hard drives. The first data storage device 840a may, for example, comprise a data storage medium 846 that is read, interrogated, and/or otherwise communicatively coupled to and/or via a disk reading device 848. In some embodiments, the first data storage device 840a and/or the data storage medium 846 may be configured to store information utilizing one or more magnetic, inductive, and/or optical means (e.g., magnetic, inductive, and/or optical-encoding). The data storage medium 846, depicted as a first data storage medium 846a for example (e.g., breakout cross-section "A"), may comprise one or more of a polymer layer 846a-1, a magnetic data storage layer 846a-2, a non-magnetic layer 846a-3, a magnetic base layer 846a-4, a contact layer 846a-5, and/or a substrate layer 846a-6. According to some embodiments, a magnetic read head 848a may be coupled and/or disposed to read data from the magnetic data storage layer 846a-2.

In some embodiments, the data storage medium 846, depicted as a second data storage medium 846b for example (e.g., breakout cross-section "B"), may comprise a plurality of data points 846b-2 disposed with the second data storage medium 846b. The data points 846b-2 may, in some embodiments, be read and/or otherwise interfaced with via a laser-enabled read head 848b disposed and/or coupled to direct a laser beam through the second data storage medium 846b.

In some embodiments, the second data storage device 840b may comprise a CD, CD-ROM, DVD, Blu-Ray™ Disc, and/or other type of optically-encoded disk and/or other storage medium that is or becomes know or practicable. In some embodiments, the third data storage device 840c may comprise a USB keyfob, dongle, and/or other type of flash memory data storage device that is or becomes know or practicable. In some embodiments, the fourth data storage device 840d may comprise RAM of any type, quantity, and/or configuration that is or becomes practicable and/or desirable. In some embodiments, the fourth data storage device 840d may comprise an off-chip cache, such as a Level 2 (L2) cache memory device. According to some embodiments, the fifth data storage device 840e may comprise an on-chip memory device, such as a Level 1 (L1) cache memory device.

The data storage devices 840a-e may generally store program instructions, code, and/or modules that, when executed by a processing device cause a particular machine to function in accordance with one or more embodiments described herein. The data storage devices 840a-e depicted in FIG. 8A, FIG. 8B, FIG. 8C, FIG. 8D, and FIG. 8E are representative of a class and/or subset of computer-readable media that are defined herein as "computer-readable memory" (e.g., non-transitory memory devices as opposed to transmission devices or media).

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. An electronic object detection and Artificial Intelligence (AI) driving monitor and incentive system, comprising:
  a video camera disposed on a vehicle and having optics oriented in a direction of travel of the vehicle;
  a Graphics Processing Unit (GPU) in communication with the video camera;
  a Central Processing Unit (CPU) in communication with the GPU;
  a short-range communications device in communication with the CPU; and
  a non-transitory memory device in communication with the CPU, the memory device storing (i) AI processing instructions, (ii) interface generation instructions, and (iii) operating instructions that when executed by the CPU, result in:
    (a) capturing, by the video camera, a plurality of images of an environment in the direction of travel of the vehicle;
    (b) receiving, by the GPU and from the video camera, data descriptive of the plurality of images;
    (c) processing, by the GPU, the data descriptive of the plurality of images;
    (d) receiving, by the CPU and from the GPU, the processed data descriptive of the plurality of images;
    (e) identifying, by an execution of an object detection algorithm of the AI processing instructions by the CPU, a first object that is present in at least two of the plurality of images;
    (f) computing, by an execution of an object classification algorithm of the AI processing instructions by the CPU, and based on differences between the first object as it occurs in a first one of the at least two of the plurality of images and a second one of the at least two of the plurality of images, a first instance of a first specific type of driving event;
    (g) updating, by the CPU and based on the computed first instance of the first specific type of driving event, a level of progress toward an award; and
    (h) transmitting, to a portable electronic device and via the short-range communications device, and by an execution of the interface generation instructions by the CPU, at least one graphical interface element descriptive of the level of progress toward the award.

2. The electronic object detection and AI driving monitor system of claim 1, wherein the first instance of the first specific type of driving event comprises a determination of a specific speed of the vehicle and wherein the updating of the level of progress toward the award, comprises:
  identifying a speed limit at the location of the vehicle;
  computing a difference between the specific speed of the vehicle and the speed limit at the location of the vehicle;
  comparing the computed difference to a pre-defined threshold value; and
  updating a number of points toward the award based on the comparing of the computed difference to the pre-defined threshold value.

3. The electronic object detection and AI driving monitor system of claim 1, wherein the first object comprises at least one of: (i) another vehicle; (ii) a stop sign; (iii) a speed limit sign, (iv) a traffic light; and (v) a speed zone sign.

4. The electronic object detection and AI driving monitor system of claim 1, wherein the first specific type of driving event comprises at least one of: (i) a yellow traffic light event; (ii) a red traffic light event; (iii) an oncoming vehicle event; and (iv) a braking event of another vehicle.

5. The electronic object detection and AI driving monitor system of claim 1, wherein the first specific type of driving event comprises at least one of: (i) a speeding event; (ii) a following-too-closely event; (iii) a complete stop event; and (iv) a smooth braking event.

6. The electronic object detection and AI driving monitor system of claim 1, wherein a geographic location of the first object is assigned to a sponsor of the award.

7. The electronic object detection and AI driving monitor system of claim 1, wherein the first instance of the first specific type of driving event comprises a determination of a specific speed of the vehicle and wherein the updating of the level of progress toward the award, comprises:
identifying a speed limit at the location of the vehicle;
comparing the specific speed of the vehicle to the speed limit at the location of the vehicle;
determining whether the vehicle is traveling faster than the speed limit at the location of the vehicle; and
updating a number of points toward the award based on the determination of whether the vehicle is traveling faster than the speed limit at the location of the vehicle.

8. The electronic object detection and AI driving monitor system of claim 7, wherein the identifying of the speed limit at the location of the vehicle, comprises:
identifying, by an execution of the object detection algorithm of the AI processing instructions by the CPU, a second object that is present in at least one of the plurality of images;
determining, by an execution of the object classification algorithm of the AI processing instructions by the CPU, that the second object comprises a speed limit sign; and
identifying, by the CPU and utilizing an optical character recognition routine, the speed limit at the location of the vehicle.

9. The electronic object detection and AI driving monitor system of claim 1, wherein the operating instructions, when executed by the CPU, further result in:
categorizing, by the CPU, the first instance of the first specific type of driving event as a safe driving event; and
computing an updated count of safe driving events by incrementing a count of safe driving events by one.

10. The electronic object detection and AI driving monitor system of claim 9, wherein the updating of the level of progress toward the award is based on the updated count of safe driving events.

11. The electronic object detection and AI driving monitor system of claim 1, wherein the operating instructions, when executed by the CPU, further result in:
categorizing, by the CPU, the first instance of the first specific type of driving event as an unsafe driving event; and
computing an updated count of unsafe driving events by incrementing a count of unsafe driving events by one.

12. The electronic object detection and AI driving monitor system of claim 11, wherein the updating of the level of progress toward the award is based on the updated count of unsafe driving events.

13. The electronic object detection and AI driving monitor system of claim 1, wherein the operating instructions, when executed by the CPU, further result in:
repeating (a)-(f) with respect to a second object and a second instance of the first specific type of driving event; and
computing, by the CPU, a value for a statistical metric based on a sum of the instances of the first specific type of driving event.

14. The electronic object detection and AI driving monitor system of claim 13, wherein the operating instructions, when executed by the CPU, further result in:
transmitting, to the portable electronic device and via the short-range communications device, and by an execution of the interface generation instructions by the CPU, at least one graphical interface element descriptive of the statistical metric based on the sum of the instances of the first specific type of driving event.

15. The electronic object detection and AI driving monitor system of claim 13, wherein the operating instructions, when executed by the CPU, further result in:
comparing the value of the statistical metric to other values of the statistical metric stored with respect to a plurality of other vehicles;
ranking, based on the comparing, the value of the statistical metric with respect to the other values of the statistical metric; and
transmitting, to the portable electronic device and via the short-range communications device, and by an execution of the interface generation instructions by the CPU, at least one graphical interface element descriptive of the ranking of the value of the statistical metric.

* * * * *